United States Patent [19]
Minowa et al.

[11] Patent Number: 5,496,227
[45] Date of Patent: Mar. 5, 1996

[54] TORQUE CONTROL METHOD AND APPARATUS FOR INTERNAL COMBUSTION ENGINE AND MOTOR VEHICLES EMPLOYING THE SAME

[75] Inventors: Toshimichi Minowa, Ibaraki; Yoshishige Ohyama, Katsuta; Hiroshi Kimura, Katsuta; Naoyuki Ozaki, Katsuta; Takashi Shiraishi, Ibaraki, all of Japan; Junichi Ishii, Novi, Mich.; Masahiko Ibamoto; Hiroatsu Tokuda, both of Katsuta, Japan

[73] Assignee: Hitachi, Ltd., Tokyo, Japan

[21] Appl. No.: 319,719

[22] Filed: Oct. 7, 1994

Related U.S. Application Data

[63] Continuation-in-part of Ser. No. 260,362, Aug. 2, 1994, which is a continuation of Ser. No. 936,005, Aug. 27, 1992, Pat. No. 5,343,781, which is a division of Ser. No. 686,527, Apr. 17, 1991, Pat. No. 5,150,635.

[30] Foreign Application Priority Data

Apr. 18, 1990 [JP] Japan ..................... 2-100321

[51] Int. Cl.$^6$ ..................... B60K 41/10; B60K 41/28
[52] U.S. Cl. ..................... 477/62; 477/110
[58] Field of Search ..................... 477/62, 110

[56] References Cited

U.S. PATENT DOCUMENTS

| | | |
|---|---|---|
| 4,008,567 | 2/1977 | Hirsch ..................... 477/110 |
| 4,226,141 | 10/1980 | Espenschied . |
| 4,281,567 | 8/1981 | Maurer ..................... 477/110 |
| 4,353,272 | 10/1982 | Schneider et al. ..................... 477/110 |
| 4,369,676 | 1/1983 | Gaus . |
| 4,370,904 | 2/1983 | Muller et al. . |
| 4,422,353 | 12/1983 | Saga et al. . |
| 4,459,879 | 7/1984 | Miki et al. . |
| 4,470,117 | 9/1984 | Miki et al. . |
| 4,493,228 | 1/1985 | Vakovich et al. . |
| 4,543,855 | 10/1985 | Oetting et al. . |
| 4,651,595 | 3/1987 | Miyawaki . |
| 4,677,880 | 7/1987 | Hattori et al. . |
| 4,774,858 | 10/1988 | Ganoung . |
| 4,843,551 | 6/1989 | Milunaus . |
| 4,848,529 | 7/1989 | Kurihara et al. . |
| 4,913,006 | 4/1990 | Tsuyama et al. . |
| 4,933,851 | 6/1990 | Ito et al. . |
| 4,966,049 | 10/1990 | Takahashi . |
| 4,972,737 | 11/1990 | Makimoto ..................... 477/110 |
| 4,977,992 | 12/1990 | Ohtsuka et al. . |
| 5,016,494 | 5/1991 | Yamaguchi . |
| 5,099,428 | 3/1992 | Takahashi . |
| 5,103,398 | 4/1992 | Akiyama . |

(List continued on next page.)

FOREIGN PATENT DOCUMENTS

| | | |
|---|---|---|
| 64-4544 | 1/1984 | Japan . |
| 62-26134 | 2/1987 | Japan . |
| 3-163256 | 7/1991 | Japan . |

*Primary Examiner*—Dirk Wright
*Attorney, Agent, or Firm*—Antonelli, Terry, Stout & Kraus

[57] ABSTRACT

Torque control method and apparatus for an internal combustion engine of a motor vehicle. A value of a desired drive shaft torque for the motor vehicle is determined on the basis of at least an accelerator pedal stroke for thereby controlling a drive shaft torque of the motor vehicle so as to assume the desired drive shaft torque value by controlling a gear ratio of a transmission gear coupling an output shaft of the engine to at least a drive shaft of the motor vehicle on the basis of the value of the desired drive shaft torque as determined. A gear ratio of the transmission gear and a flow rate of intake air fed to the engine are determined through different procedures in dependence on whether or not a torque transfer mechanism coupling the output shaft of the engine to an input shaft of the transmission gear is in a lock-up state in which the output shaft and the input shaft are coupled directly without slip. The drive shaft torque of the motor vehicle is so controlled that it assumes the desired drive shaft torque by controlling the transmission gear and engine intake air flow rate such that the determined gear ratio and the determined intake air flow rate can be realized.

43 Claims, 25 Drawing Sheets

U.S. PATENT DOCUMENTS

| | | |
|---|---|---|
| 5,122,956 | 6/1992 | Satoh et al. . |
| 5,131,293 | 7/1992 | Kaiser et al. . |
| 5,133,232 | 7/1992 | Kikuchi et al. .......................... 477/62 |
| 5,150,635 | 9/1992 | Minowa et al. .......................... 477/43 |
| 5,184,527 | 2/1993 | Nakamura ............................... 477/110 |
| 5,245,966 | 9/1993 | Zhang et al. ............................ 477/110 |
| 5,343,781 | 9/1994 | Minowa et al. ......................... 477/107 |

F I G. 13B
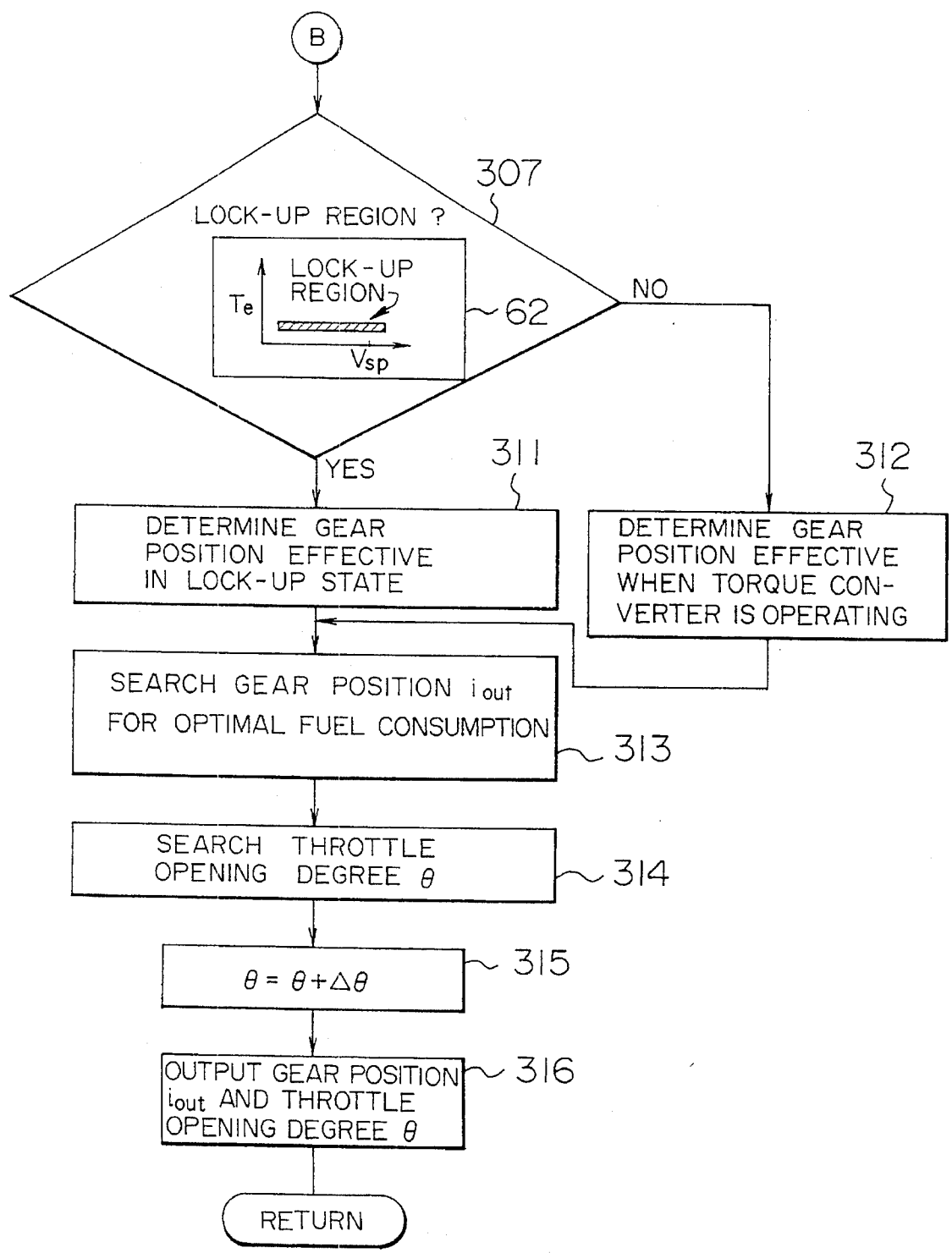

FIG. 18A $$N_{tb} = V_{sp} * gear(n) * i_{end} * k_6 \quad \text{------} \quad 1$$
$$N_{tc} = N_t - N_{tb} \quad \text{------} \quad 2$$
$$N_{eb} = V_{sp} * gear(n) * i_{end} * k_7 \quad \text{------} \quad 3$$
$$N_{ec} = N_e - N_{eb} \quad \text{------} \quad 4$$
$$Time = (N_{ec} * \Delta T) / (N_{e(n-1)} - N_e) \quad \text{------} \quad 5$$
$$DN_t = N_{tc} * \Delta T / Time \quad \text{------} \quad 6$$
$$N_t = N_t - DN_t \quad \text{------} \quad 7$$

FIG. 18B $$N_{tb} = V_{sp} * gear(n) * i_{end} * k_8$$
$$N_{tc} = N_{tb} - N_t$$
$$N_{eb} = V_{sp} * gear(n) * i_{end} * k_9$$
$$N_{ec} = N_{eb} - N_e$$
$$Time = (N_{ec} * \Delta T) / (N_e - N_{e(n-1)})$$
$$DN_t = N_{tc} * \Delta T / Time$$
$$N_t = N_t - DN_t$$

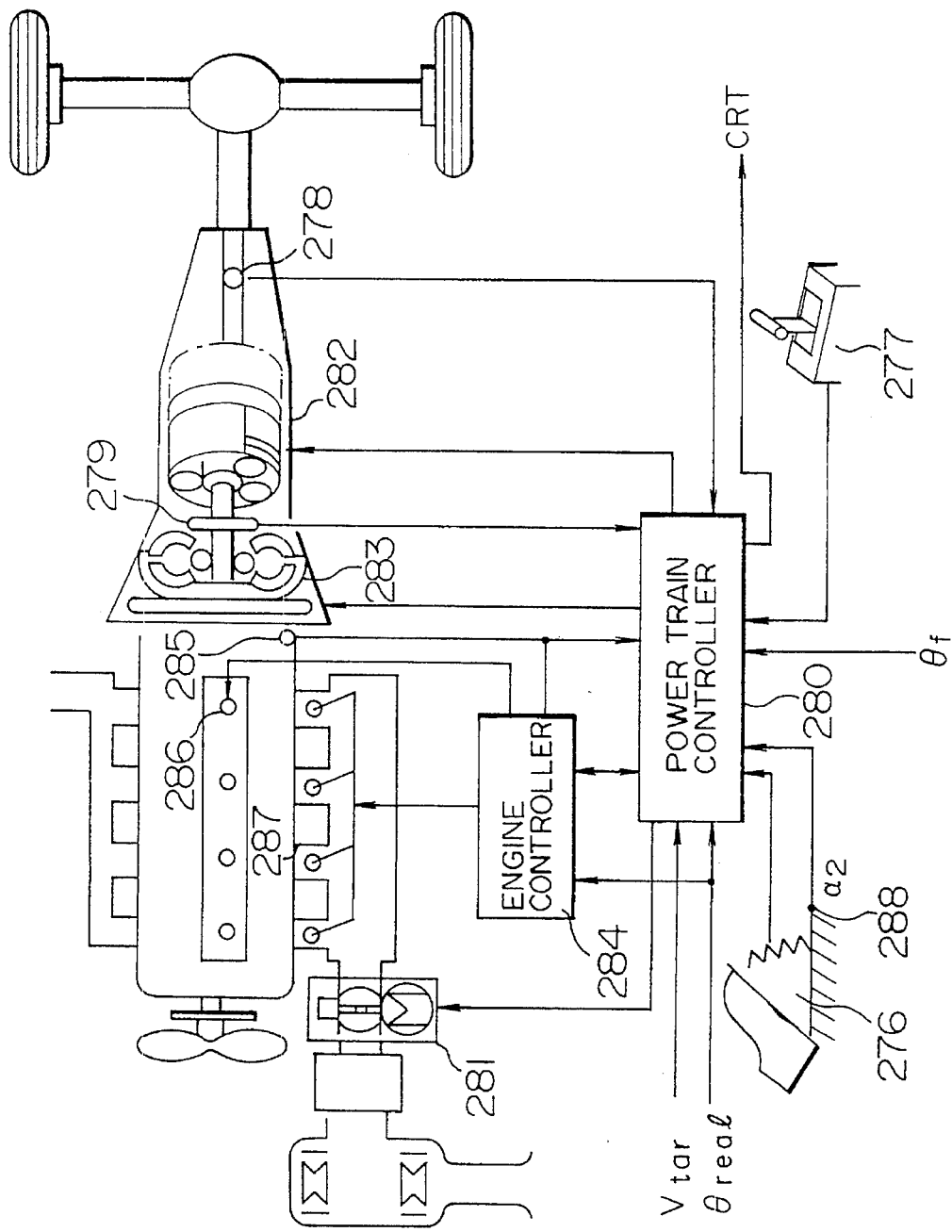

MINIMUM FUEL COST GEAR RATIO CALCULATION FLOW CHART (1)

MINIMUM FUEL COST GEAR RATIO CALCULATION FLOW CHART (2)

TORQUE CONTROL METHOD AND APPARATUS FOR INTERNAL COMBUSTION ENGINE AND MOTOR VEHICLES EMPLOYING THE SAME

CROSS-REFERENCE TO RELATED APPLICATION

This is a continuation-in-part of U.S. Ser. No. 08/260,362, filed Aug. 2, 1994, still pending, entitled "Method and Apparatus for Controlling Driving Power of Motor Vehicle" which is a continuation of U.S. Ser. No. 07/936,005 filed Aug. 27, 1992 now U.S. Pat. No. 5,343,781 which is a divisional of U.S. patent application Ser. No. 07/686,527 filed Apr. 17, 1991 now U.S. Pat. No. 5,150,635. The disclosure of these applications are incorporated herein by reference.

BACKGROUND OF THE INVENTION

The present invention generally relates to a comprehensive or all-round control system for a power train system of an automobile or motor vehicle. More particularly, the invention is concerned with a torque control method and an apparatus for carrying out the same which can profitably ensure high-efficiency operation of an internal combustion engine (hereinafter also referred to as the engine for short).

In a motor vehicle equipped with an automatic transmission gear (also known as the automatic speed change gear) and an electrically controlled throttle, such an engine torque control is adopted that a driving power (driving torque) required by the motor vehicle is determined on the basis of detection signals outputted, respectively, from an accelerator pedal stroke sensor (i.e., a sensor for detecting a stroke or depression depth of the accelerator pedal of the motor vehicle) and a vehicle speed sensor (i.e., sensor for detecting a speed of the motor vehicle), as is disclosed in, for example, JP-A-3-163256 (Japanese Unexamined Patent Application Publication No. 163256/1991). Parenthetically, this literature will hereinafter be referred to as the first related art. In that case, the driving power (driving torque) is determined by resorting to a fuzzy estimation procedure which is based on a fuel cost preference rule, a torque transmission performance preference rule and an engine noise suppression preference rule, wherein the gear position (speed change position) of the automatic transmission and the throttle opening degree which correspond to the desired driving power (driving torque) are arithmetically determined or calculated. On the basis of the values as determined, the automatic transmission and the throttle opening degree are controlled. The three rules mentioned above constitute a fuzzy set with a speed ratio (i.e., the ratio between the output shaft rotation number of the torque converter and the input shaft rotation number thereof) being used as a parameter, wherein the membership function of the fuzzy set is determined with reference to the desired speed ratio determined according to the three rules mentioned above. For more particulars, reference should be made to the first related art mentioned above.

On the other hand, the fuel-cost improvement of the motor vehicle presents a problem which is incessantly tackled with for solution. To this end, there has been proposed in conjunction with the internal combustion engine equipped with the electronically controlled throttle a method of arithmetically determining the opening degree of the throttle valve and the gear ratio of the transmission gear which are required for realizing a minimum fuel cost (l/Km) (i.e., a minimum fuel consumption per unit running or travel distance of the motor vehicle) on the basis of the stroke (depression depth) of the acceleration pedal and the vehicle speed of the motor vehicle, wherein the throttle valve and the gear ratio of the transmission gear are determined so that the minimum fuel cost can be achieved. Typical examples of this method are disclosed in JP-A-62-26134 (also referred to as the second related art) and JP-A-3-163256.

Incidentally, the fuel cost may also be defined as a running distance (Km/l) per unit fuel consumption. However, in the following description, it is assumed that the fuel cost is given by a fuel consumption per unit distance (i.e., l/Km).

Further, there is known an approach for decreasing the fuel cost by reducing the less (pumping loss) due to engine suction resistance (negative pressure resistance) by using the engine torque in the vicinity of the maximum value thereof at each of the gear ratios, as is disclosed in Otto Holzinger et al.: "Automotive Electronics-Integration and Partitioning", Robert Bosch GmbH, Vehicle Electronics Meeting Society's Needs: Energy, Environment, Safety, Proceedings of the 1992 International Congress on Transportation Electronics, P-260, pp. 247–252 (named the third related art).

SUMMARY OF THE INVENTION

The first related art however suffers from a problem that the fuel-cost performance will be degraded when the power transfer performance preference rule and the engine noise suppression preference rule are selected. Besides, because only the desired speed ratio is determined, the technique according to this related art is effective only when the torque converter is operated, whereas in the lock-up control in which the input and output shafts of the torque converter are coupled directly without slip, the results of the arithmetic operation mentioned above become unreasonable, making it impossible to realize an optimal torque control and an optimal fuel-cost control.

On the other hand, when the throttle valve opening degree and the gear position at which the fuel cost becomes minimum are arithmetically determined to be controlled, the optimal gear ratio will change instantaneously in response to even an insignificant or small change in the running state of the motor vehicle and the acceleration pedal stroke, as a result of which in an operation range of the motor vehicle where difference in the fuel cost due to difference in the gear positions is small, the gear ratio of the automatic transmission will be changed over at an undesirably high frequency. In other words, a so-called busy shift phenomenon takes place, degrading significantly the maneuverability of the motor vehicle.

However, in the case of the first related art, no consideration is paid for occurrence of the busy-shift event, whereby the maneuverability of the motor vehicle is significantly degraded, to a great disadvantage.

Further, in the third related art mentioned above, the throttle valve will be fully opened even within a range where the accelerator pedal stroke is small, whereby the engine torque may assume a value close to a maximum. Thus, there may unwantedly occur overrunning of the engine even in the manual shift ranges of reverse (R) and the first speed range, giving rise to another serious problem.

In the light of the state of the art described above, it is an object of the present invention to provide a torque control method and an apparatus for carrying out the same which can ensure compatibly both an improved torque transfer performance and a fuel economy by taking into consideration for the torque control a state where a torque converter is operating and a state where the torque convertor is not operating (i.e., the lock-up state of the torque converter).

Another object of the present invention is to provide a torque control method and apparatus for an internal combustion engine which can reduce or mitigate a load imposed on a CPU (Central Processing Unit) of an engine control apparatus.

Yet another object of the present invention is to provide a torque control method and apparatus which are capable of realizing a torque control with high accuracy.

Still another object of the present invention is to provide a torque control method and apparatus for an internal combustion engine of a motor vehicle which can make available with high accuracy the information concerning a permissible travel distance over which the motor vehicle can run with a remaining amount of fuel.

It is a further object of the present invention to provide a torque control method and apparatus which can ensure high safety and enhanced reliability in operation.

It is a still further object of the present invention to provide a control apparatus for an automatic transmission of a motor vehicle which can control the throttle valve opening degree and the gear position so that a minimum fuel cost can be realized while suppressing positively the busy shift mentioned previously, to thereby improve the fuel economy and the maneuverability of the motor vehicle.

In view of the above and other objects which will become apparent as the description proceeds, there is provided according to an aspect of the present invention a torque control method for an internal combustion engine of a motor vehicle, in which a value of a desired drive shaft torque for the motor vehicle is determined on the basis of at least an accelerator pedal stroke for thereby controlling a drive shaft torque of the motor vehicle so as to assume the desired drive shaft torque by controlling a gear ratio of a transmission gear coupling an output shaft of the engine to at least a drive shaft of the motor vehicle on the basis of the value of the desired drive shaft torque as determined, wherein the torque control method includes the step of changing over procedures from one to other for determining a gear ratio of the transmission gear and a flow rate of intake air fed to the internal combustion engine in dependence on whether or not a torque transfer mechanism (torque converter) coupling the output shaft of the internal combustion engine to an input shaft of the transmission gear is in a lock-up state.

At this juncture, terminological definition will be necessary. Namely, with the phrase "lock-up state of the torque converter", it is intended to mean the state in which the input shaft and the output shaft of the torque converter are coupled directly to each other without slip.

With the arrangement of the torque control method mentioned above that the gear ratio and the intake air flow rate (throttle opening degree) are changed in dependence on whether or not the torque converter typifying the torque transfer mechanism is in the lock-up state, the torque control can be performed by taking into consideration the operating state of the torque transfer mechanism or torque converter.

In a preferred mode for carrying out the invention, in the step of determining the gear ratio and the intake air flow rate, at least one gear ratio at which the determined desired drive shaft torque can be realized at a detected value of vehicle speed of the motor vehicle is determined, for thereby selecting one of the gear ratios as determined at which an optimal fuel cost can be achieved.

In another preferred mode for carrying out the present invention, in the step of selecting the gear ratio at which the optimal fuel cost can be realized, a map prescribing relations at least among values corresponding to the desired drive shaft torques, the gear ratios of the transmission gear and the flow rates of the intake air fed to the engine is searched on the basis of the determined desired drive shaft torque, to thereby select from the gear ratios a gear ratio at which the optimal fuel cost can be achieved.

In this manner, the gear ratio and the intake air flow rate (throttle opening degree) can determined such that the optimal fuel cost is realized. In this connection, owing to adoption of the map search procedure, the load imposed on the CPU of the engine control apparatus can significantly be reduced.

According to another aspect of the present invention, there is provided a torque control method for an internal combustion engine of a motor vehicle, which method includes the steps of determining a value of a desired drive shaft torque of the motor vehicle on the basis of at least an accelerator pedal stroke, determining on the basis of the determined value of the desired drive shaft torque a gear ratio of a transmission gear coupling an output shaft of the engine to at least a drive shaft of the motor vehicle and a flow rate of intake air fed to the engine (step b), determining a value corresponding to an actual drive shaft torque of the motor vehicle (step c), correcting at least either one of the gear ratio or the intake air flow rate obtained in the above step (b) with a deviation of the value determined in the above step (c) from the determined desired drive shaft torque; and controlling the drive shaft torque of the motor vehicle so that the drive shaft torque assumes the desired drive shaft torque by controlling the transmission gear and the intake air flow rate so that the gear ratio and intake air flow rate as corrected can be realized.

By providing a feed-back control loop in the manner described above, the torque control can be performed such that difference between the actual torque and the desired torque becomes zero, whereby the torque control can be effectuated with high accuracy at high speed.

Further, according to yet another aspect of the present invention, there is provided a torque control method for an internal combustion engine of a motor vehicle, which method includes the steps of determining a value of a desired drive shaft torque of the motor vehicle on the basis of at least an accelerator pedal stroke (step a), determining on the basis of the determined value of the desired drive shaft torque a gear ratio of a transmission gear coupling an output shaft of the engine to at least a drive shaft of the motor vehicle and a flow rate of intake air fed to the engine (step b), and controlling the drive shaft torque of the motor vehicle so that the drive shaft torque assumes the desired drive shaft torque by controlling the transmission gear and the intake air flow rate so that the gear ratio and intake air flow rate as determined can be realized (step c), wherein the step (b) mentioned above includes a sub-step in which when a current manual shift range of the transmission gear includes only one gear ratio, the one gear ratio is selected and fixed, and only the intake air flow rate is controlled on the basis of the determined value of the desired drive shaft torque or the accelerator pedal stroke.

With the arrangement described above, the gear ratio select control is not performed, but the gear ratio is fixed to the current gear ratio, and only the intake air flow rate is controlled, when the speed range such as the reverse (R) range or the first speed range which has only one gear ratio is selected. By virtue of this feature, the overrunning of the engine can be positively be prevented when the torque control is performed with the reverse (R) range or the first speed range being selected.

In a mode for carrying out the present invention, it is preferred that in the step of determining the gear ratio and the intake air flow rate on the basis of the desired drive shaft torque, the intake air flow rate is controlled on the basis of ratio between a detected value of the output shaft rotation number of the transmission gear and the output shaft rotation number of the torque converter, when the speed change is being effected.

By virtue of the arrangement mentioned above, shock ascribable to the speed change operation of the transmission gear can satisfactorily be prevented.

In a further preferred mode for carrying out the present invention, the output shaft rotation number of the torque converter is determined on the basis of a detected value of the output shaft rotation number of the transmission gear and a detected value of an input shaft rotation number of the torque converter without resorting to use of a sensor.

Owing to the arrangement mentioned above, the torque control apparatus can be implemented inexpensively.

In a yet further mode for carrying out the invention, it is preferred that when the accelerator pedal stroke sensor is abnormal, the desired drive shaft torque is determined on the basis of a detection signal outputted from a detecting unit capable of outputting a detection signal equivalent to that of the accelerator pedal stroke sensor.

As the detecting unit mentioned above, an acceleration switch outputting the detection signal by detecting whether the accelerator pedal stroke is zero or not may be employed.

The use of a simple sensor as an auxiliary sensor for the accelerator pedal stroke sensor also contributes to cost reduction in implementing the torque control apparatus.

In this conjunction, the opening degree of a throttle valve may be set to zero when the acceleration switch mentioned above indicates the accelerator pedal stroke of zero, and if otherwise, the opening degree of the throttle valve is set at a predetermined angle greater than zero degree with the transmission gear being set to a predetermined gear ratio.

Owing to the arrangement, there can be ensured a necessary minimum running capability for the motor vehicle even upon occurrence of abnormality in the accelerator pedal stroke sensor without incurring any appreciable expensiveness.

According to still further aspect of the present invention, there is provided a torque control method for an internal combustion engine of a motor vehicle, which method includes the steps of determining a value of a desired drive shaft torque of the motor vehicle on the basis of at least an accelerator pedal stroke (step a), determining on the basis of the determined value of the desired drive shaft torque a gear ratio of a transmission gear coupling an output shaft of the engine to at least a drive shaft of the motor vehicle and a flow rate of intake air fed to the engine (step b) and controlling the drive shaft torque of the motor vehicle so that the drive shaft torque assumes the desired drive shaft torque by controlling the transmission gear and the intake air flow rate so that the gear ratio and intake air flow rate as determined can be realized (step c), wherein the step (b) includes a sub-steps (b-1) of selecting the gear ratio at which an optimal fuel cost can be achieved on the basis of at least the determined desired drive shaft torque, and a sub-step (b-2) in which when an absolute value of difference between a fuel consumption at the current gear ratio and a fuel consumption at the gear ratio selected in the sub-step (b-1) exceeds a predetermined value, the current gear ratio is changed over to the gear ratio selected in the sub-step (b-1).

With the arrangement described above in which the gear ratio is changed only when difference in the fuel cost between the currently effective gear ratio and the currently determined gear ratio is greater than a predetermined value inclusive, while the currently effective gear ratio is maintained as it is when the above difference is smaller than the predetermined value, the frequent change-over of the gear ratios (i.e., so called busy shift) can be avoided.

In yet another mode for carrying out the present invention, the procedure for determining the gear ratio should preferably be made different in dependence on the down-shift operation and the up-shift operation of the transmission gear. Further, hysteresis should preferably intervene between the up-shift operation and the down-shift operation upon changing of the gear ratio of the transmission gear. In that case, even in the operation range in which difference in the fuel cost due to difference in the gear position is small, the so-called busy shift phenomenon can satisfactorily be suppressed with the maneuverability of the motor vehicle being prevented from degradation.

On the other hand, because appearance of hysteresis in accompanying the change of the gear ratio is limited to the operation range in which difference in the fuel cost due to difference in the gear ratio is small, degradation in the fuel-cost performance can be suppressed to a minimum, whereby the torque control can be carried out with the fuel cost being lowered to a minimum.

The invention will become more readily apparent from the following description of preferred embodiments thereof shown, by way of example only, in the drawings.

BRIEF DESCRIPTION OF THE DRAWINGS

FIGS. 13A and 13B show flow charts for illustrating operations of the torque control apparatus shown in FIG. 12;

FIGS. 18A and 18B show flow charts for illustrating a procedure for estimating a rotation number of an output shaft of a torque converter;

FIG. 21 is a schematic diagram showing a hardware configuration of a torque control apparatus according to the present invention;

DESCRIPTION OF THE PREFERRED EMBODIMENTS

Now, the torque control method for an internal combustion engine of a motor vehicle and an apparatus for carrying out the same according to the invention will be described in conjunction with preferred or exemplary embodiments thereof by referring to the accompanying drawings.

Figure 1:
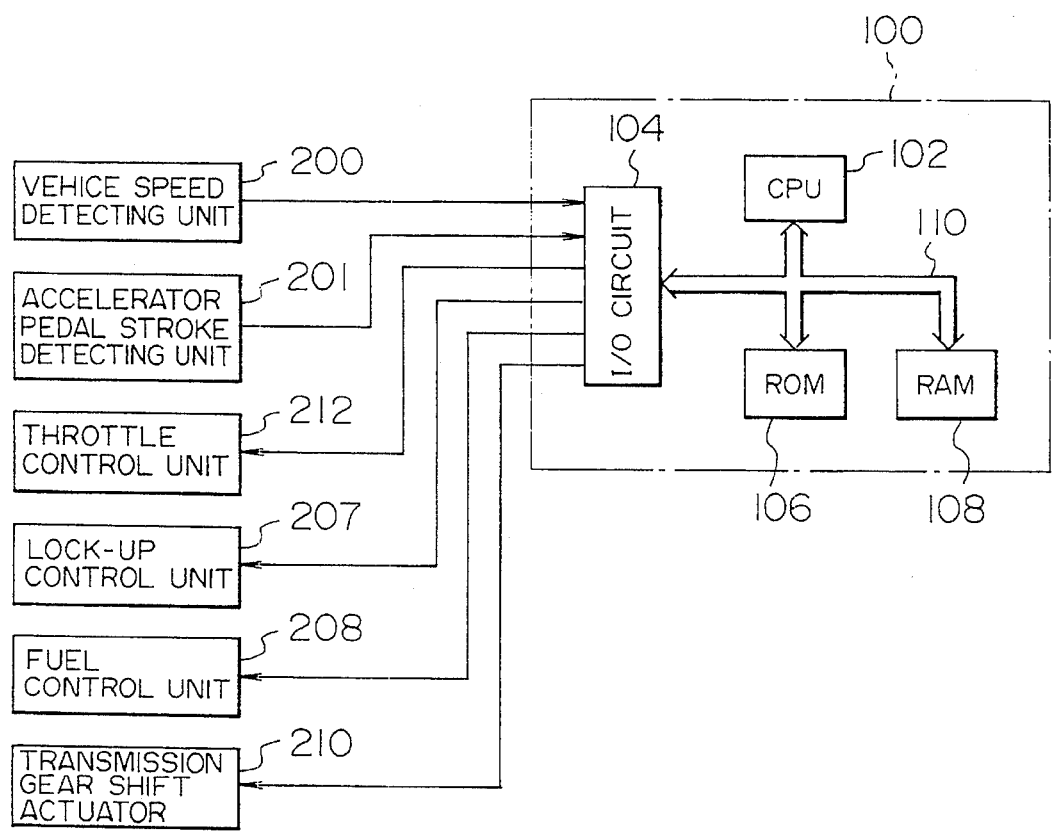
FIG. 1 is a block diagram showing in general an arrangement or configuration of a torque control apparatus for an internal combustion engine according to a first embodiment of the invention.

FIG. 1 is a block diagram showing in general an arrangement or configuration of a torque control apparatus for an internal combustion engine (hereinafter simply referred to as the engine) according to an embodiment of the invention. Referring to the figure, the torque control apparatus according to the instant embodiment of the invention is comprised of a vehicle control unit 100, a vehicle speed detecting unit 200, an accelerator pedal stroke detecting unit 201, a throttle valve control unit 212, a transmission gear actuator 210, a lock-up control unit 207 and a fuel (supply) control unit 208. On the other hand, the vehicle control apparatus 100 includes a CPU (Central Processing Unit) 102, an input/output (I/O) circuit 104, a ROM (Read-Only Memory) 106, a RAM (Random Access Memory) 108 and a bus 110 for interconnecting the components mentioned above.

Figure 2:
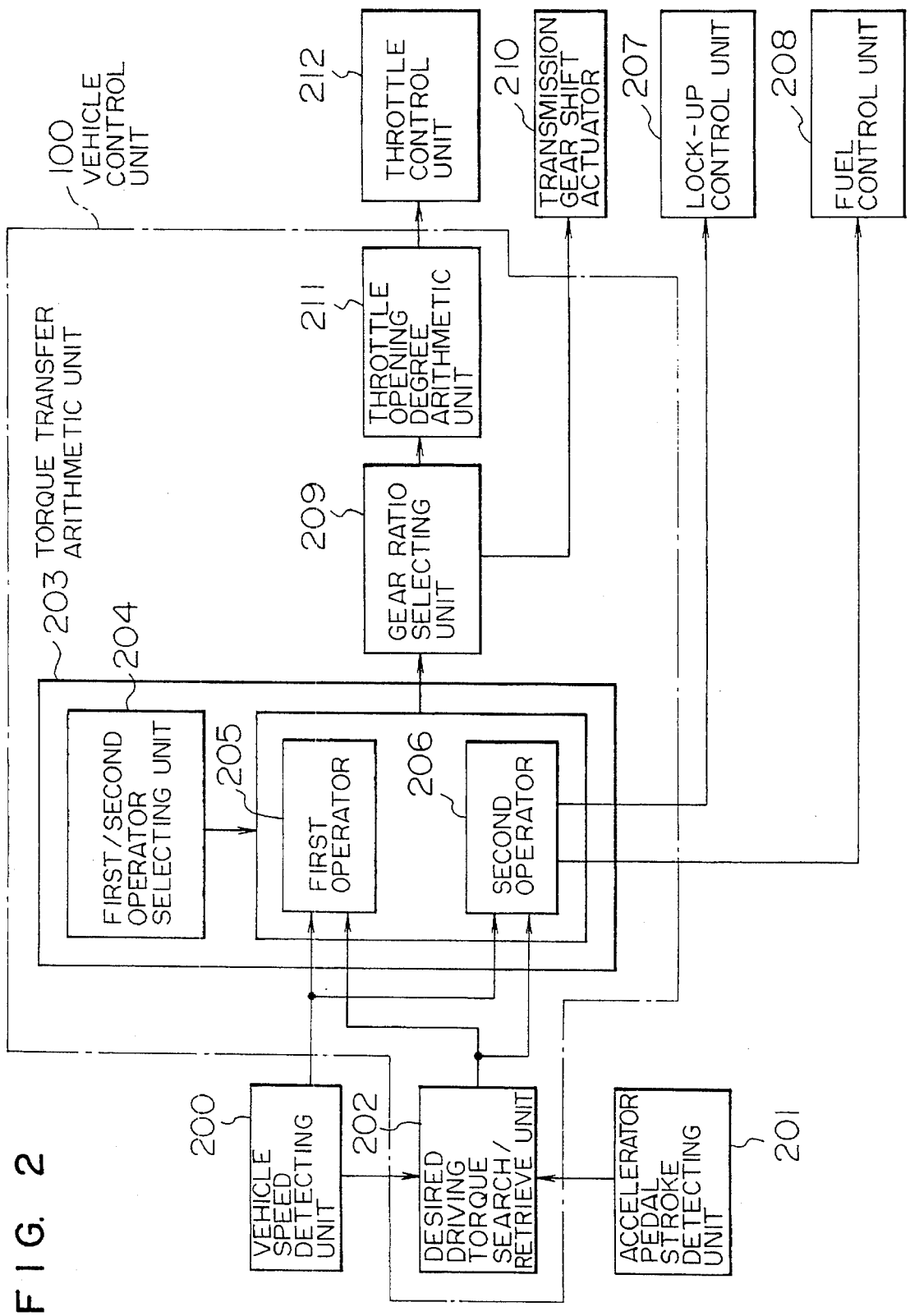
FIG. 2 is a functional block diagram showing in details functions of a vehicle control apparatus shown in FIG. 1.

FIG. 2 is a functional block diagram showing in details functions of the vehicle control apparatus 100. As can be seen in FIG. 2, the vehicle control apparatus 100 is comprised of a torque transmission arithmetic unit 203 which includes a first operator 205, a second operator 206 and a first/second operator selecting unit 204 for selecting either one of the first operator 205 or 206, a gear ratio selecting unit 209 for selecting a gear ratio of a transmission gear and a throttle opening degree arithmetic unit 211, wherein the first operator 205 and the second operator 206 are stored in the ROM 106 or RAM 108 shown in FIG. 1. Functions of the units 203, 209 and 211 are performed by the CPU 102 in accordance with programs stored in the ROM 106. Of course, these functions may be realized by resorting to the use of a wired logic circuit.

At this juncture, it should be mentioned that various embodiments of the invention described hereinbefore by reference to FIG. 3 to FIG. 22B are based on the system configuration shown in FIGS. 1 and 2.

Next, description will turn to the functions and operations of the individual constituents or components shown in FIG. 2. The vehicle speed detecting unit 200 is designed to detect the current vehicle speed of the motor vehicle, while the accelerator pedal stroke detecting unit 201 is adapted to detect the stroke or depression depth of the accelerator pedal which indicates a desired driving torque for the motor vehicle as demanded by a driver. The motor vehicle speed as detected and the demanded driving torque are inputted to a desired driving torque search/retrieve unit 202. There are stored in the desired driving torque search/retrieve unit 202 the driving torque patterns determined previously by taking into account the engine operation noise and a driving torque margin. The desired driving torque search/retrieve unit 202 responds to the vehicle speed and the demanded driving torque as inputted, to thereby output a desired driving torque corresponding to the vehicle speed and the demanded driving torque. Incidentally, the vehicle speed is detected in terms of rotation number (rpm) of the output shaft of the transmission gear in the apparatus according to the instant embodiment of the invention.

The value of the desired driving torque delivered from the desired driving torque search/retrieve unit 202 is supplied to the torque transfer arithmetic unit 203. In response thereto, the first/second operator selecting unit 204 of the torque transfer arithmetic unit 203 makes decision as to whether a torque converter constituting a part of a torque transfer mechanism is to be used or alternatively a lock-up control is to be performed. In dependence on the result of this decision, the first/second operator selecting unit 204 selects either the first operator 205 or the second operator 206. In the case where the second operator 206 is selected, the duty ratio supplied to the lock-up control unit 207 is controlled. In this conjunction, the duty ratio of 100% indicates the state in which an input shaft and an output shaft of the torque converter are directly coupled without any slip, while the duty ratio smaller than 100% indicates a corresponding magnitude of the slip between the mutually coupled input and output shafts of the torque converter. When the lock-up control is selected, the first/second operator selecting unit 204 sends a control signal to the fuel control unit 208 for suppressing variation in the output torque of the engine.

The torque transfer arithmetic unit 203 responds to the decision made by the first/second operator selecting unit 204 to thereby arithmetically determine the torque of the output shaft of the torque converter on the basis of the detected vehicle speed and the desired driving torque for every gear ratio which the automatic transmission gear can assume. On the other hand, the gear ratio selecting unit 209 selects the gear ratio at which the torque transfer efficiency between the input shaft and the output shaft becomes maximum and outputs a control signal to the transmission gear shift actuator 210 so that the selected gear ratio can be realized. Subsequently, the throttle opening degree arithmetic unit 211 arithmetically determines the throttle opening degree which corresponds to the desired driving torque to thereby supply a control signal to the throttle valve control unit 212 so that the throttle opening degree determined arithmetically can be established.

Figure 3:
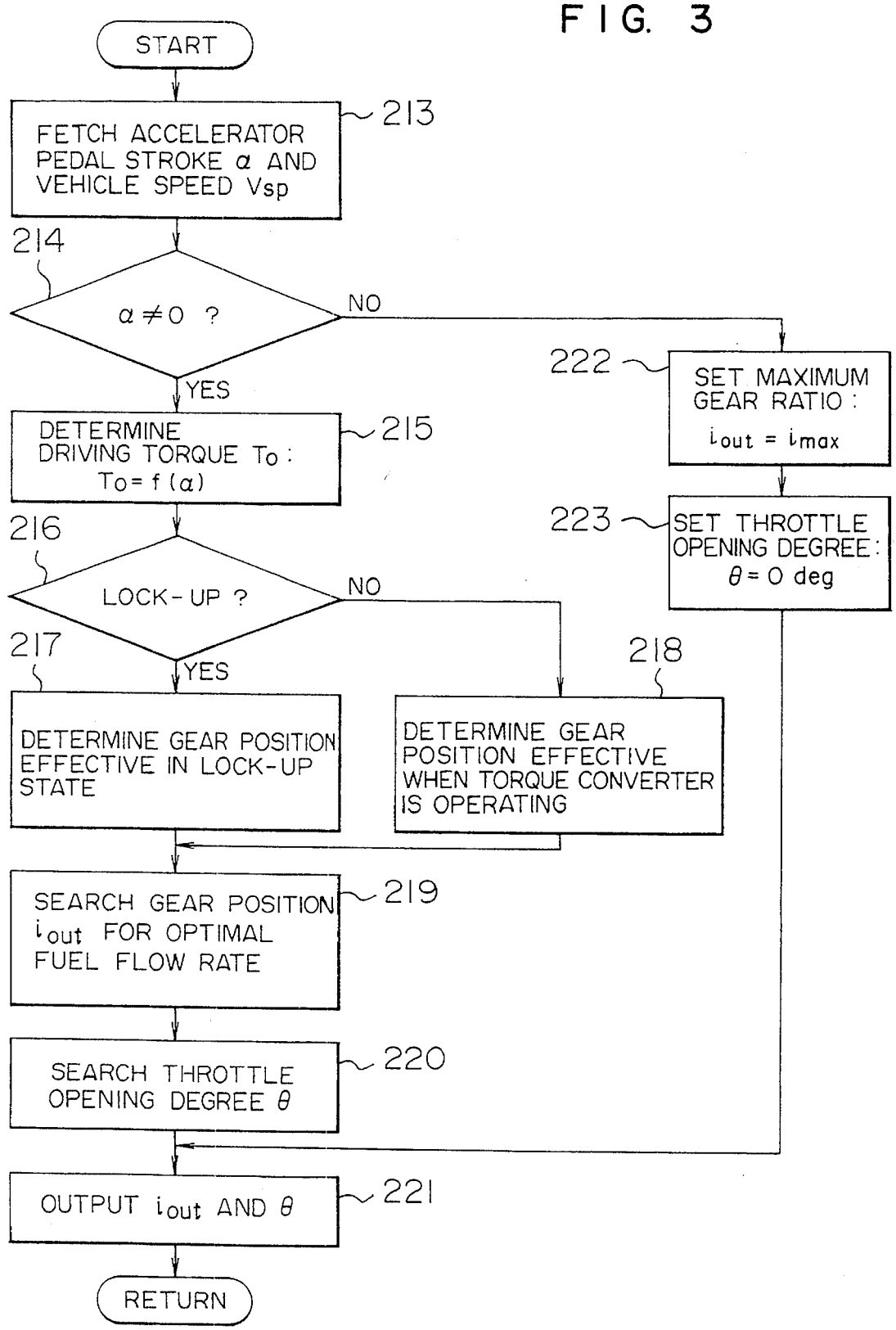
FIG. 3 is a flow chart for illustrating a processing procedure for carrying out a torque control method according to an embodiment of the present invention.

FIG. 3 is a flow chart for illustrating a processing procedure involved in carrying out the torque control method according to an embodiment of the invention. Referring to the figure, in a step 213, an accelerator pedal stroke $\alpha$ and the vehicle speed $V_{sp}$ are fetched from the outputs of the accelerator pedal stroke detecting unit 201 and the vehicle speed detecting unit 200, respectively, which is then followed by a step 214 where it is decided whether the accelerator pedal stroke $\alpha$ is zero or not. Unless the accelerator pedal stroke $\alpha$ is zero, the processing proceeds to a step 215 where a driving torque $T_0$ corresponding to the accelerator pedal stroke $\alpha$ is arithmetically determined in accordance with a predetermined function f of the accelerator pedal stroke $\alpha$. In succession, in a step 216, it is decided whether or not the current driving state of the motor vehicle is in the lock-up state. (In the case of the instant embodiment of the invention, it is assumed, only by way of example, that the current driving state is the lock-up state with the duty ratio being 100%.) When the lock-up state is determined, the processing proceeds to a step 217 where an effective gear position (or speed shift position) in the lock-up state is arithmetically determined, which is then followed by execution of a step 219. Unless the current driving state is the lock-up state, i.e., when the torque converter is operating, the processing proceeds to a step 218 where the effective gear position is arithmetically determined, whereupon the processing proceeds to a step 219.

In the step 219, a gear position (or speed shift position) $i_{out}$ where an optimal flow rate (l/h) of the fuel supplied to the engine, i.e., an optimal fuel consumption economy or fuel economy for short can be realized is searched and retrieved by referencing a map prepared previously. In a succeeding step 220, the throttle opening degree $\theta$ comparable to the driving torque at the gear position $i_{out}$ as retrieved is searched and retrieved by referencing a map also prepared previously. Finally, in a step 221, the gear position $i_{out}$ and the throttle opening degree $\theta$ are outputted. On the other hand, when it is decided in the step 214 that the accelerator pedal stroke $\alpha$ is zero, the processing proceeds to a step 222 where the gear position $i_{out}$ is set equal to a maximum gear position $i_{max}$, which is then followed by a step 223 where the throttle opening degree $\theta$ is set to zero degree. Then, an output step 221 is executed.

FIGS. 4 to 8 are flow charts for illustrating in more detail the control procedure described above.

Figure 4:
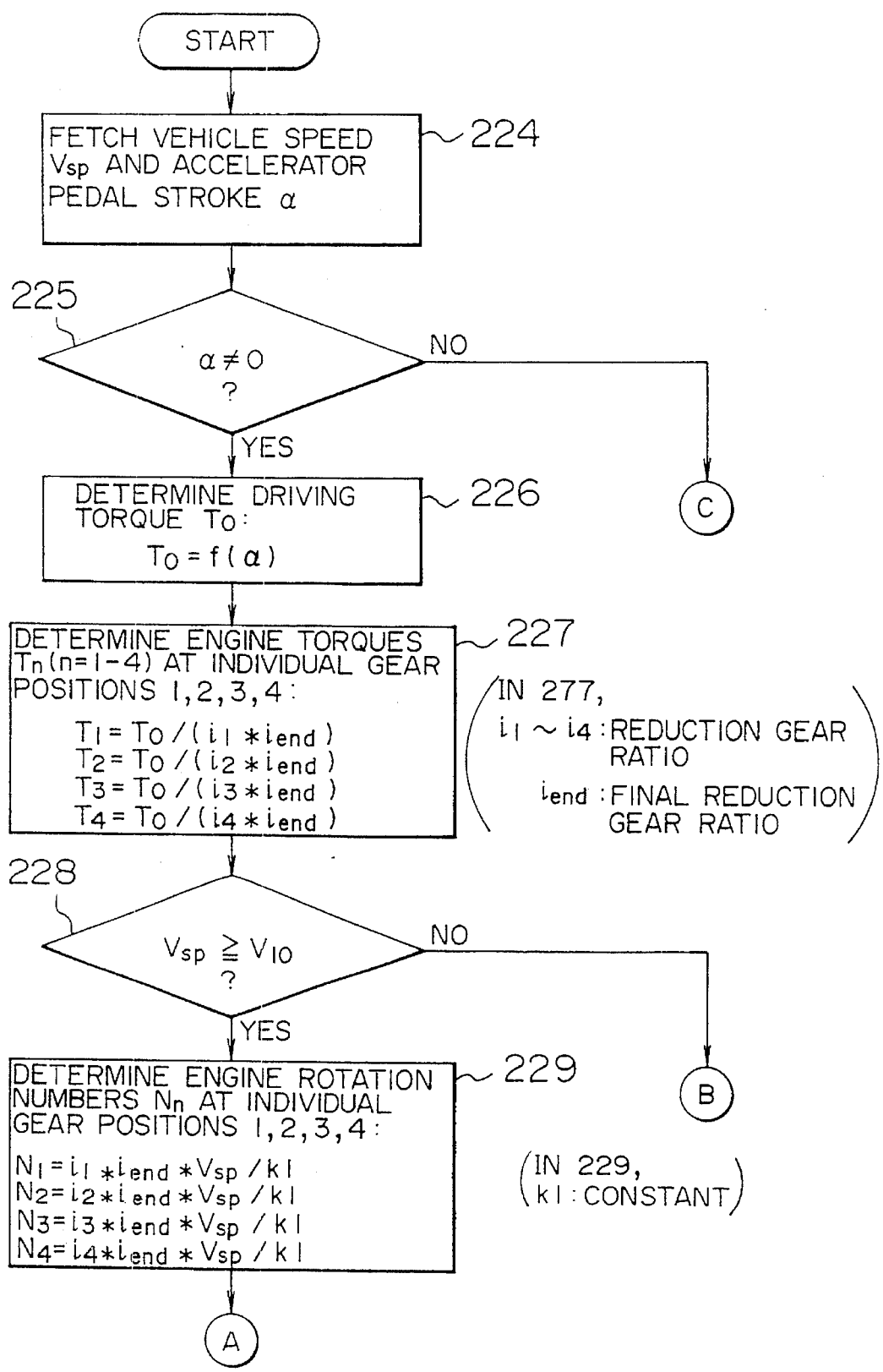
FIG. 4 is a flow chart for illustrating a torque control procedure effectuated when a torque converter is in a lock-up state in the control procedure shown in FIG. 3.
Figure 5:
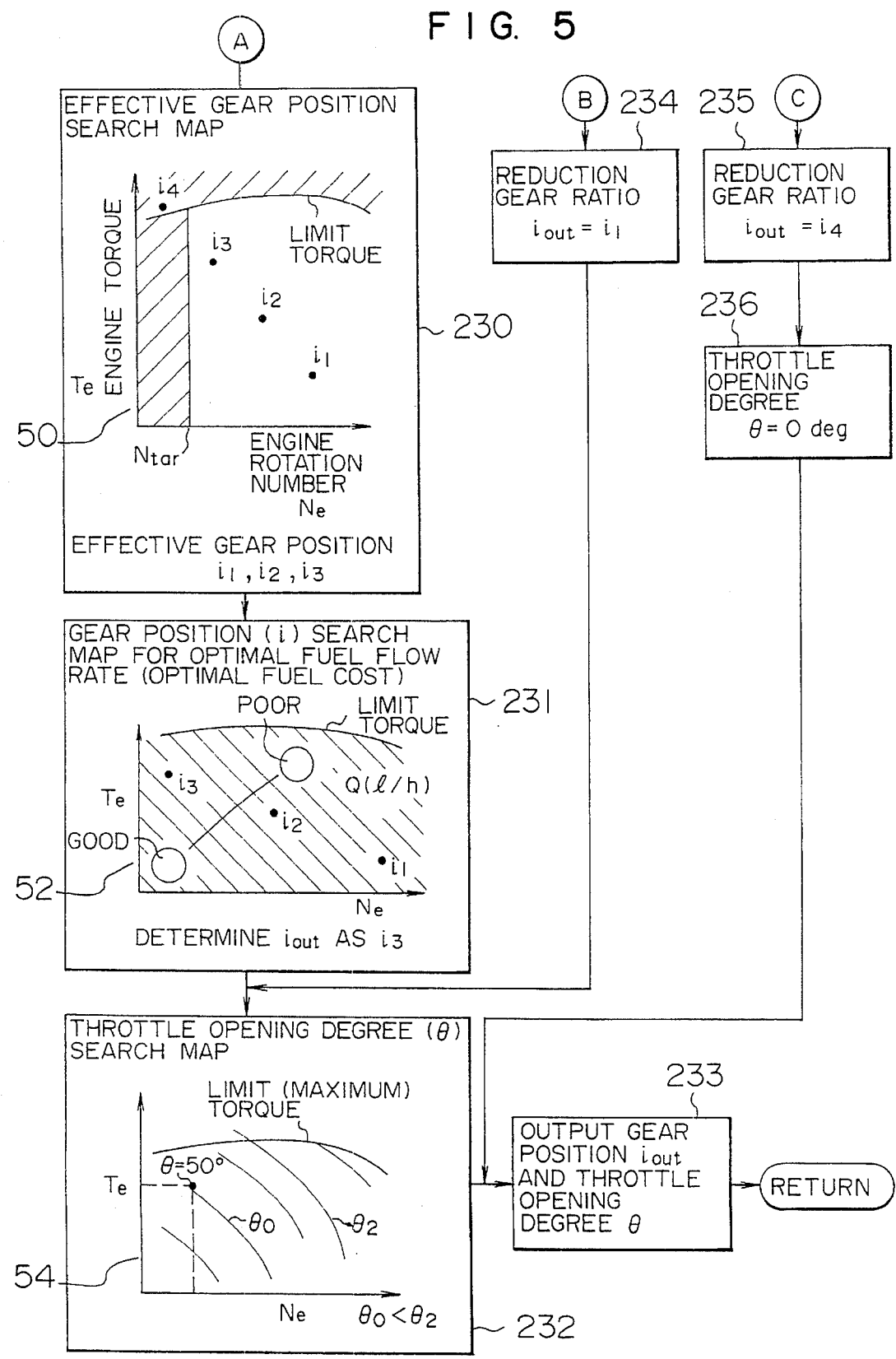
FIG. 5 is a flow chart for illustrating a torque control procedure effectuated when a torque converter is in a lock-up state in the control procedure shown in FIG. 3.

In the first place, description will be directed to the procedure taken in the lock-up state by reference to FIGS. 4 and 5. At first, in a step 224, the accelerator pedal stroke $\alpha$ and the current vehicle speed $V_{sp}$ as detected are fetched. Subsequently, in a step 225, decision is made as to whether or not the accelerator pedal stroke $\alpha$ is zero. Unless the accelerator pedal stroke $\alpha$ is zero, the processing proceeds to a step 226 and, if otherwise, to a branch "C" in FIG. 5. In the step 226, the driving torque $T_0$ is arithmetically determined in accordance with an expression representing a torque as a predetermined function f of the accelerator pedal stroke $\alpha$. In succession, in a step 227, engine torques $T_n$ at the transmission gear ratios which the automatic transmission can assume are arithmetically determined. By way of example, in the case of the transmission gear having four gear ratios, i.e., four speed shift positions, four engine output torques $T_{t1}$ to $T_{t4}$ are arithmetically determined in accordance with:

$$T_{t1}=T_0/(i_1 \times i_{end})$$

$$T_{t2}=T_0/(i_2 \times i_{end})$$

$$T_{t3}=T_0/(i_3 \times i_{end})$$

$$T_{t4}=T_0/(i_4 \times i_{end})$$

where $i_1$ to $i_4$ represent the four reduction gear ratios, respectively, $i_{end}$ represents reduction gear ratio of a differential or final gear, and $T_{t1}$ to $T_{t4}$ represent engine output torques, respectively.

In a succeeding step 228, it is decided whether or not the current vehicle speed $V_{sp}$ exceeds the desired vehicle speed $V_{10}$ (the speed in the state where the lock-up is established). In the case where $V_{sp} \geq V_{10}$, the processing proceeds to a step 229, while when $V_{sp}<V_{10}$, it proceeds to a branch "B" in the flow chart shown in FIG. 5. In the step 229, the engine rotation number (rpm) $N_n$ (where n=1 to 4) at each of the speed shift positions (corresponding to the transmission gear ratios) is determined, whereupon the processing proceeds to the branch "A" shown in FIG. 5 and hence to a step 230. In this step 230, the effective gear position is searched and determined by referencing an effective gear position search map 50 on the basis of the engine torques ($T_1$ to $T_4$) in first to fourth speed ranges and the engine rotation numbers. In the effective gear position search map 50, there are defined a limit engine rotation number $N_{tar}$ and limit torques. To be more concrete, the effective gear position search map 50 is prepared by plotting relations between the desired engine torques $T_e$ and the engine rotation numbers $N_e$ determined in the steps 227 and 229. Points representing the transmission gear ratios $i_1$ to $i_4$ lie on an equi-HP (horse power) line representing that the product of the engine torque $T_e$ and the engine rotation number $N_e$ remains constant. Further, in the effective gear position search map 50, an upper hatched area represents an area of torques which can not be outputted by the engine now of concern. On the other hand, a hatched area at a left-hand side of the effective gear position search map 50 represents an area where uncomfortable vibration takes place due to the lock-up to thereby degrade the maneuverability of the motor vehicle or a region where the engine rotation number is smaller than the idle rotation number. In the case of the effective gear position search map 50 now under consideration, the gear position $i_4$, i.e., the fourth speed range falls within the hatched area mentioned above. Accordingly, the transmission gear ratios which can be used for arithmetic determination of the fuel cost are limited to the gear positions $i_1$, $i_2$ and $i_3$.

In a succeeding step 231, the gear position (or speed shift position) corresponding to an optimal fuel flow rate is searched by referencing an optimal fuel flow versus gear position search map 52 for optimal flow rate (optimal fuel cost). More specifically, the gear position search map for optimal fuel flow rate 52 contains data representing characteristically the fuel flow rates (l/hour) for the desired engine rotation numbers $N_e$ and the desired engine torques $T_e$. The fuel consumption per unit time decreases as the engine rotation number $N_e$ and the engine torque $T_e$ become small and vice versa. Namely, in a lower left area of the gear position search map for the optimal fuel flow rate (optimal fuel cost) 52, the fuel consumption rate is small, i.e., improved. The effective gear ratio for the equi-HP as plotted in the effective gear position search map 50 can be plotted at a similar position as in the case of the effective gear position search map 50, because both the maps represent the relations between the desired engine torques $T_e$ and the desired engine rotation numbers $N_e$. Thus, by referencing the gear position search map for the optimal fuel flow rate 52, the transmission gear ratio at which the fuel cost ratio is lowest, e.g. the gear ratio $i_3$, is selected. Let's assume that the gear ratio corresponding to the 3rd speed range is selected in the step 231. Then, in a step 232, the throttle opening degree $\theta$ for the gear ratio $i_3$ (3rd speed range) is searched on the basis of the engine torque and the engine rotation number by referencing a throttle opening degree search map 54, which is then followed by a step 233 where the gear position $i_{out}$ and the throttle opening degree $\theta$ as determined are outputted. The throttle opening degree search map 54 contains data representing characteristically the throttle opening degree in dependence on the desired engine rotation number $N_e$ and the desired engine torque $T_e$. In the throttle opening degree search map 54, the topmost curve represents limit torques and hence the maximum throttle opening degree at the relevant engine rotation number $N_e$. At this juncture, it is noted that when the desired engine rotation number Ne increases for a given same throttle opening degree, the resistance to the engine intake air increases, which results in that the desired engine torque $T_e$ decreases. Because in the throttle opening degree search map 54, the desired engine rotation number $N_e$ is taken along the abscissa with the desired engine torque $T_e$ along the ordinate, as in the case of the effective gear position search map 50 and the gear position search map for optimal fuel flow rate 52, the point indicating the gear ratio as determined in the step 231 can be plotted at a corresponding position in the throttle opening degree search map 54. Thus, by outputting the throttle opening degree at this point, e.g. $\theta=50°$, there can be realized the minimum fuel cost and the desired driving torque output.

The effective gear position search map 50, the gear position search map for optimal fuel flow rate 52 and the throttle opening degree search map 54 as well as other maps which will be described hereinafter are stored in the RAM 108 shown in FIG. 1.

Parenthetically, when it is determined in the step 231 that the fuel flow rates Q are equal to each other for the gear ratios $i_2$ and $i_3$, the transmission gear ratio should be shifted up or down. When the transmission gear is to be shifted up, it is preferred to shift the transmission gear ratio toward the higher speed range (e.g. fourth speed range) as early as possible because then the fuel cost can correspondingly be reduced. On the other hand, when the transmission gear ratio is to be shifted down, it is preferred to shift the transmission gear ratio toward the low speed range (first speed range) as early as possible because then the driver can enjoy feeling of acceleration, already starting from the low speed range.

When it is decided in the step 228 that the current vehicle speed $V_{sp}$ is lower than the desired vehicle speed, the gear position $i_{out}$ is replaced by the gear ratio $i_1$ in the step 234 in FIG. 5, whereupon the throttle opening degree corresponding to the gear ratio $i_1$ is searched in the step 232. Further, when the decision step 225 shows that the accelerator pedal stroke $\alpha$ is zero, the processing proceeds to a step 235 where the gear ratio $i_4$ is substituted for the gear position $i_{out}$ with the throttle opening degree—being set to zero degree, to be subsequently outputted in a step 233.

FIGS. 6 to 9 are flow charts for illustrating in detail the processing procedures for torque control when a torque converter (a torque transfer mechanism) is employed. Referring to the figure, in a step 237, the accelerator pedal stroke $\alpha$ and the current vehicle speed $V_{sp}$ as detected are fetched. In a succeeding step 238, it is decided whether or not the accelerator pedal stroke—is zero. Unless the accelerator pedal stroke $\alpha$ is zero, the processing proceeds to a step 239 and, if otherwise, to a branch "B" shown in FIG. 8. In the step 239, the driving torque $T_0$ is arithmetically determined as a function f of the accelerator pedal stroke $\alpha$. In a step 240, torque converter output shaft torques $T_{tn}$ at every gear position (or speed shift position) are arithmetically determined. Assuming, by way of example, that there are available four speed range positions, the torque converter output shaft torques $T_{tn}$ (where n represents an integer in a range of "1" to "4") can arithmetically be determined as follows:

$$T_{t1}=T_0/(i_1 \times i_{end})$$

$$T_{t2}=T_0/(i_2 \times i_{end})$$

$$T_{t3}=T_0/(i_3 \times i_{end})$$

$$T_{t4}=T_0/(i_4 \times i_{end})$$

where $i_1$ to $i_4$ represent the reduction gear ratios, respectively, $i_{end}$ represents reduction gear ratio of a differential or final gear, and $T_{t1}$ to $T_{t4}$ represent the torque converter output shaft torques at the four gear (speed shift) positions, respectively.

In a step 241, torque converter output shaft rotation numbers $N_{tn}$ (where n=1 to 4) at every gear position are arithmetically determined. Subsequently, the processing proceeds to a step 242 shown in FIG. 7, where the torque converter output shaft rotation number $N_{tn}$ as determined is set as a desired engine rotation number $T_{Nen}$ (where N represents an integer in a range of "1" to "4"). Subsequently, in a step 243, a desired engine torque $T_e$ is determined by referencing a power transmission characteristic map 56 with the aid of the speed ratio ($N_{tn}/T_{Nen}$) and the desired engine rotation number $T_{Nen}$.

The power transmission characteristic map 56 contains data representing characteristically the speed ratios $N_{tn}/T_{Nen}$ for the desired engine torque $T_e$ and the desired engine rotation number $T_{Nen}$, where n represents an integer which changes in dependence on the transmission gear ratios. Namely, for the first speed range, n assumes a value of "1" for the second speed range, n assumes a value of "2" and so forth. In the power transmission characteristic map 56, the characteristic curves are shifted rightward, as viewed in FIG. 7, as the speed ratio mentioned above increases, i.e., as the slip decreases. When the torque converter is employed, slip takes place when the desired engine torque $T_e$ is of a large value, rendering it impossible to make available an area where the engine rotation number is small with the engine torque being high. In other words, in dependence on the speed ratio mentioned above, the operation range of the engine (i.e., the range of the desired engine rotation number $N_e$ and the desired engine torque $T_e$) is determined. By taking advantage of this relation, the desired engine torque $T_e$ can be determined on the basis of the desired engine rotation number $T_{Nen}$ and the aforementioned speed ratio.

In a step 244, a torque ratio $\lambda_1 = T_{in}/T_e$ is arithmetically determined. Further, in a step 245, a torque ratio search map 58 is searched by using the speed ratio $(N_{in}/T_{Nen})$ as a parameter to thereby determine the torque ratio $\lambda_2$.

The torque ratio search map 58 contains data representing torque converter characteristic (torque ratio). The torque converter characteristic curve shows that the torque ratio $\lambda_2$ tends to decrease as the speed ratio $(N_{in}/T_{Nen})$ increases, wherein the torque ratio $\lambda_2$ assumes a value of "1.0" when the speed ratio is in the vicinity of "0.8", which indicates that the torque intensifying action of the torque converter is invalidated. With the aid of this torque ratio search map 58, there can be determined the torque ratio.

In a step 246, decision is made as to whether or not the torque ratio $\lambda_1$ is greater than the torque ratio $\lambda_2$ inclusive thereof. Unless $\lambda_1 \geq \lambda_2$, the desired engine rotation number $T_{Nen}$ is incremented by one in a step 247, whereupon the step 243 is resumed.

The torque ratio may be decided acceptable in the step 245 when the value thereof lies within a range of $(\lambda_2 - k) \leq \lambda_1 \leq (\lambda_2 + k)$. Further, the amount of incrementation in the step 247 may be "+10" or "+20". The series of decision steps mentioned above are executed for all of the first to fourth speed ranges. When the decision steps for all the speed ranges result in affirmation "YES" (i.e., $\lambda_1 \geq \lambda_2$), the processing proceeds to a branch "C" shown in FIG. 8. Thus, in a step 248, the engine torque $T_{e1}$ to $T_{e4}$ as well as the engine rotation numbers $T_{Ne1}$ to $T_{Ne4}$ are determined for all the gear positions (or speed shift positions), respectively, and stored in the memory (RAM) to be utilized in a succeeding step 249. Namely, in the step 249, the gear position which can ensure the optimal fuel flow rate (optimal fuel cost) is searched by referencing the gear position search map 52 for the optimal fuel flow rate. When the gear ratio $i_1$ (the first speed range) is selected, then the throttle opening degree $\theta$ is searched or determined on the basis of the engine torque and the engine rotation number at the gear ratio $i_1$ (for the first speed range) as selected. In a step 251, the gear position $i_{out}$ and the throttle opening degree $\theta$ as determined are outputted. When a decision step 251 shown in FIG. 6 results in that the accelerator pedal stroke $\alpha$ is equal to zero, the processing proceeds to a step 252 shown in FIG. 8 where the gear ratio $i_4$ is set as the gear position $i_{out}$, while in a step 253, the throttle opening degree $\theta$ is set to zero degree, whereupon the step 251 is resumed.

Here, it should be mentioned that when the torque converter is employed, the transmission efficiency thereof varies in dependence on the slip taking place in the torque converter. Consequently, the engine rotation number and the output shaft rotation number of the torque converter vary in dependence on the slip taking place in the torque converter except for the lock-up state. For this reason, slip in the torque converter will have to be taken into account in order to execute the optimal fuel cost determination with high accuracy. The characteristics of the torque converter can be represented in terms of the input/output shaft rotation number ratio e $(N_t/N_e)$, wherein the torque ratio $\lambda$ and a pump capacity coefficient C vary as a function of the ratio e $(N_t/N_e)$. Incidentally, the output shaft torque $T_t$ of the torque converter is given by the expression that $T_t = C\lambda N_e^2$.

As is apparent from the foregoing description, according to the instant embodiment of the present invention, it is possible to generate the desired torque regardless of whether the lock-up state prevails or not, because the torque control method based on the gear ratio and the intake air flow rate is changed in dependence on the lock-up state or the torque converter operating state, instead of the torque control where only the lock-up state is taken into consideration as in the case of the prior art.

Figure 6:
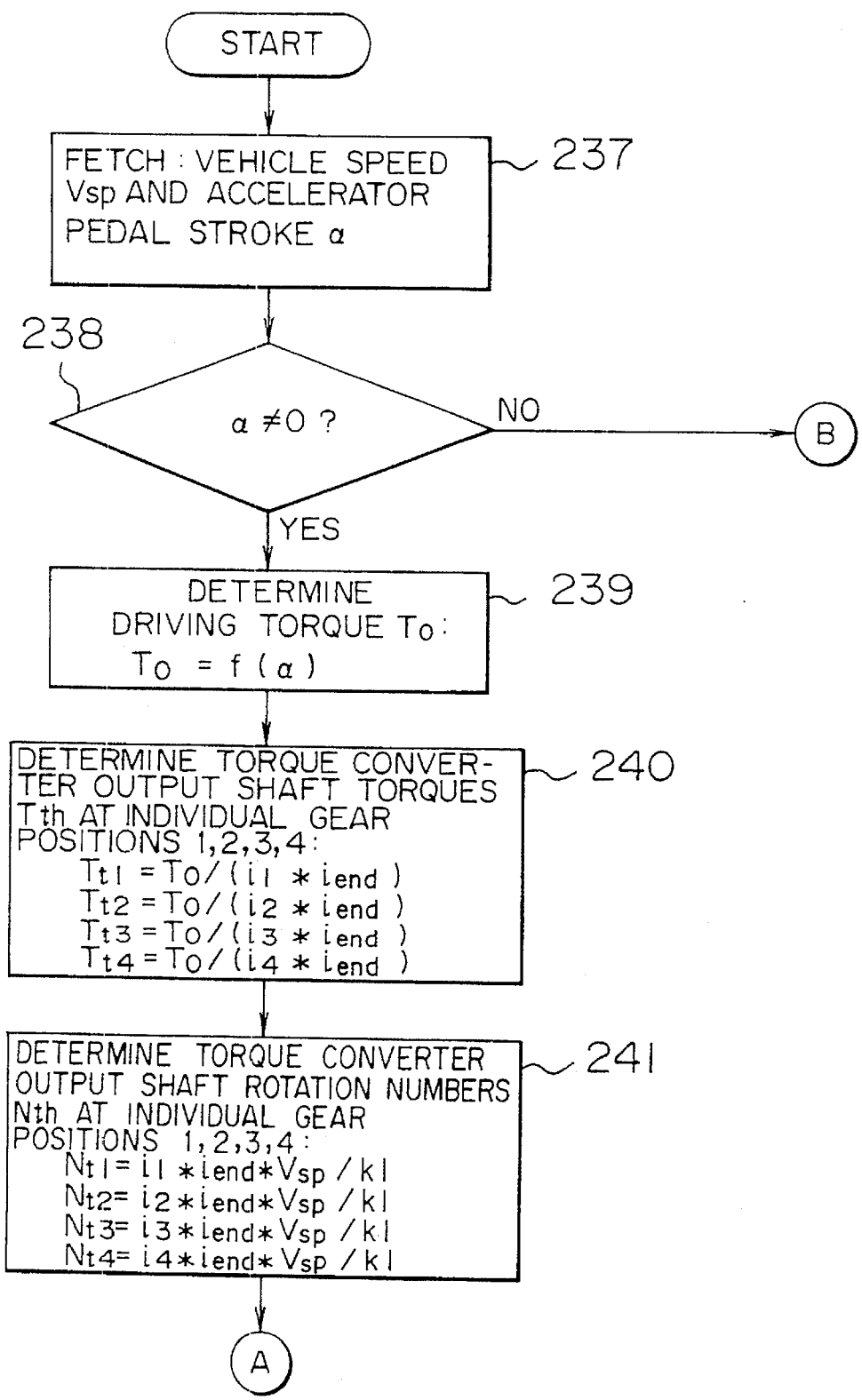
FIG. 6 is a flow chart for illustrating a torque control procedure when the torque converter is operating in the control procedure shown in FIG. 3.
Figure 7:
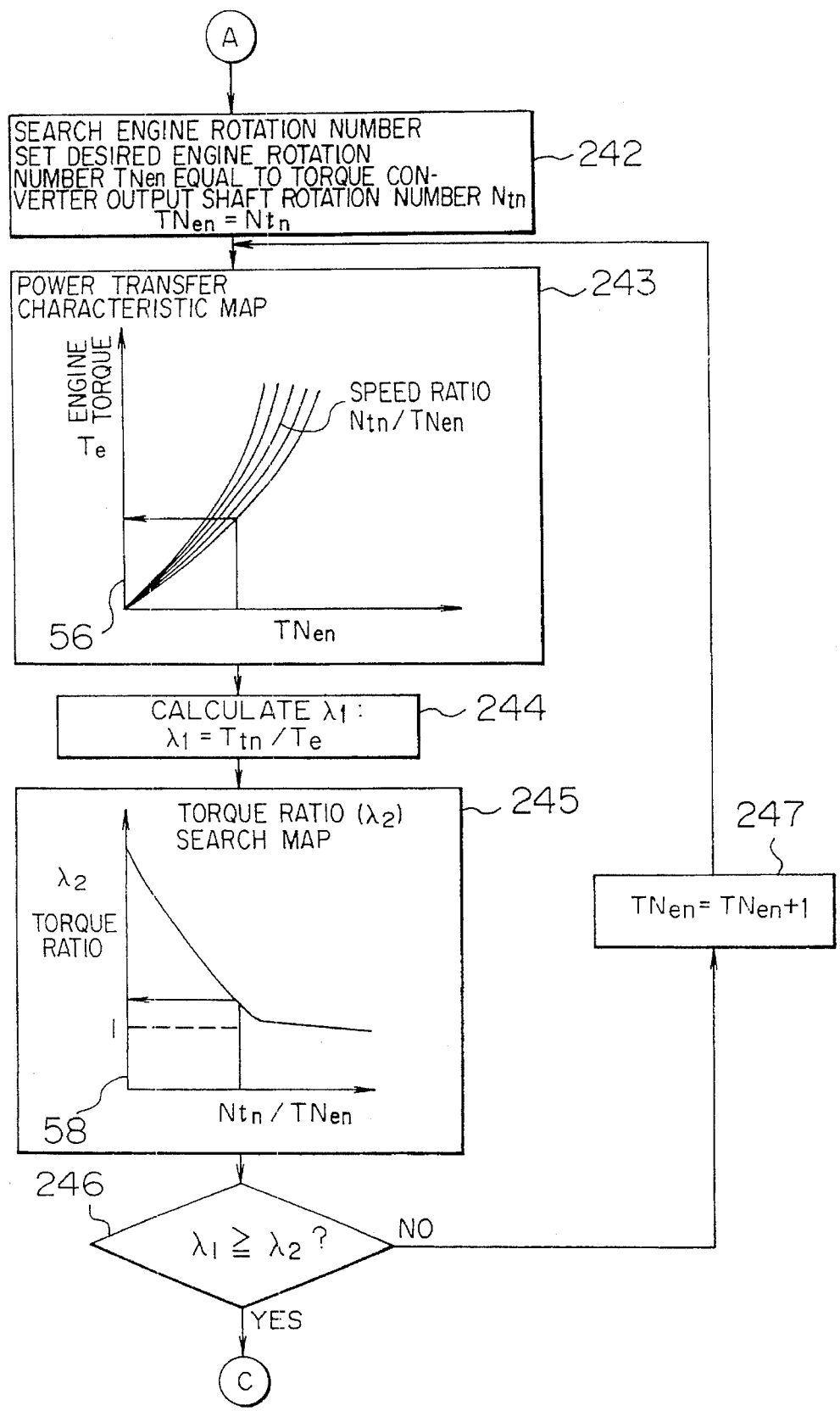
FIG. 7 is a flow chart for illustrating a torque control procedure when the torque converter is operating in the control procedure shown in FIG. 3.
Figure 8:
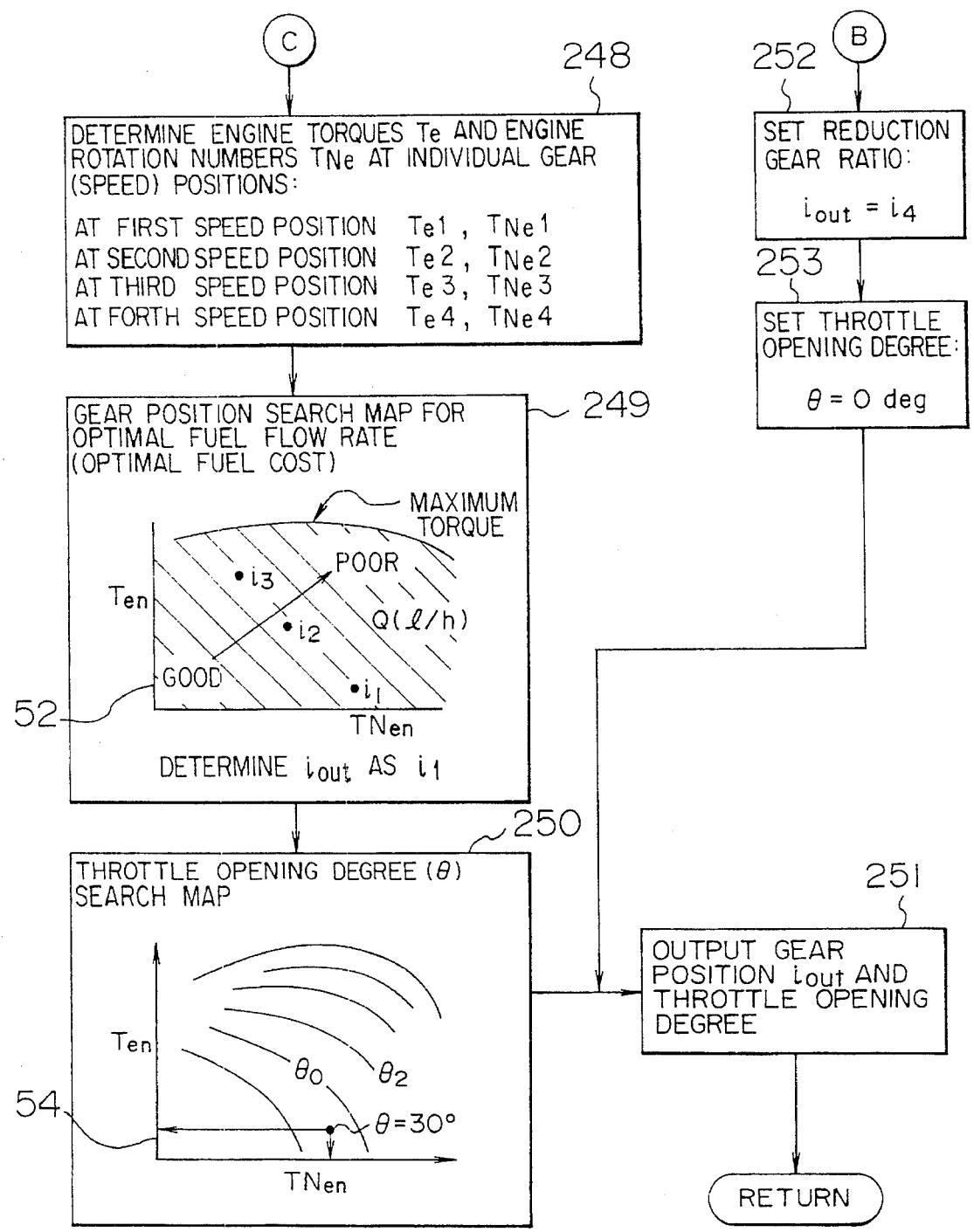
FIG. 8 is a flow chart for illustrating a torque control procedure when the torque converter is operating in the control procedure shown in FIG. 3.
Figure 9:
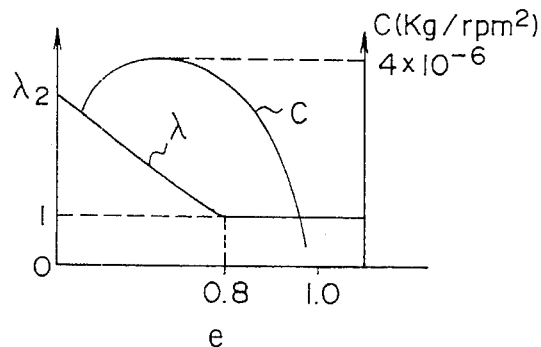
FIG. 9 is a view for illustrating graphically characteristics of a torque converter.
Figure 10:
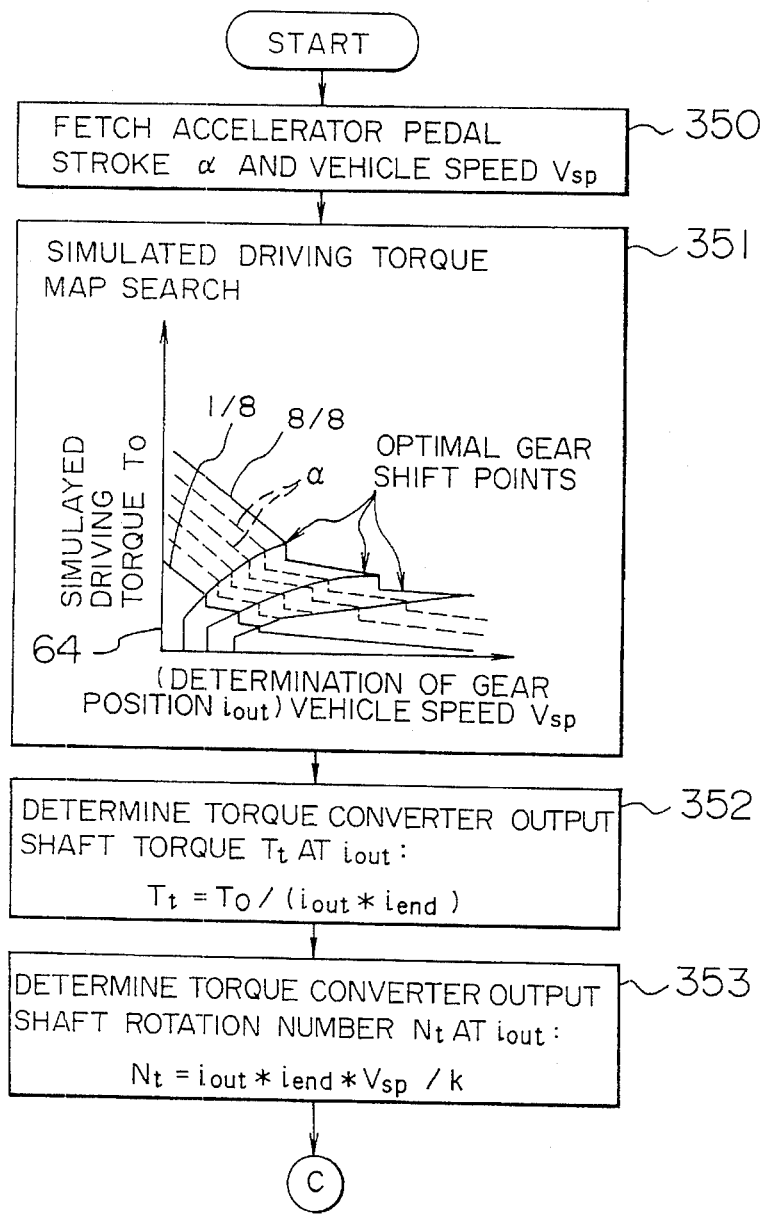
FIG. 10 is a flow chart illustrating an alternative for the procedures shown in FIGS. 6 to 8.
Figure 11:
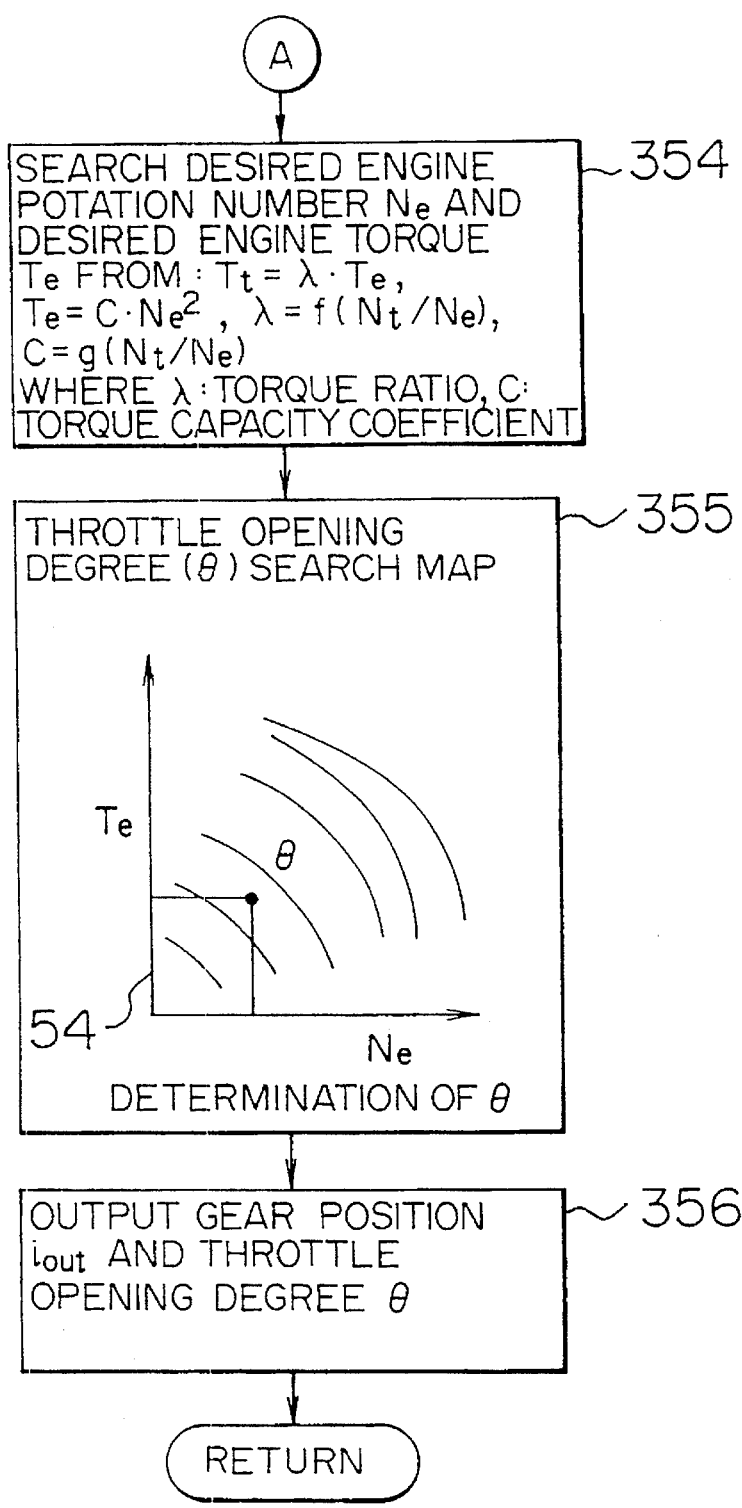
FIG. 11 is a flow chart illustrating another alternative for the procedures shown in FIGS. 6 to 8.

FIG. 10 and 11 show a modification of the embodiment described hereinbefore by reference to FIGS. 6 to 8. Referring to FIG. 10, detected values of the accelerator pedal stroke $\alpha$ and the current vehicle speed $V_{sp}$ are first fetched in a step 350, which is followed by a step 351 where a simulated drive torque is retrieved from a simulated driving torque map 64 by using the accelerator pedal stroke $\alpha$ and the current vehicle speed $V_{sp}$ as fetched. The simulated driving torque map 64 contains data concerning the gear positions (or speed shift positions) corresponding to the optimal fuel cost. Besides, the simulated driving torque map 64 contains acceleration patterns determined previously as a function of the accelerator pedal stroke $\alpha$ such that when the accelerator pedal stroke $\alpha$ is about one eighth of the full stroke, the driving torque of such magnitude which overcomes the running resistance of the motor vehicle is required, while in a range of the accelerator pedal stroke $\alpha$ from ⅛ to ⅝ (full stroke), the driving torque is caused to change in proportional dependence on the accelerator pedal stroke $\alpha$. Additionally, the simulated driving torque map 64 is prepared by taking into account the engine operation noise and a driving torque margin so that the gear change (speed shift) can be effectuated at the engine rotation number where the engine operation noise is less significant when the accelerator pedal stroke $\alpha$ is small as it lies in the range smaller than three eighths of the full stroke. Subsequently, in a step 352, the torque converter output shaft torque $T_t$ corresponding to the gear position (or speed shift position) determined in the step 351 is calculated. Furthermore, in a step 353, the current vehicle speed $V_{sp}$ and the torque converter turbine (output shaft) rotation number $N_t$ at the above gear position (or speed shift position) are calculated. Subsequently, in a step 354 shown in FIG. 11, the desired engine torque $T_e$ and the desired engine rotation number $N_e$ are arithmetically determined in accordance with the expressions characteristic of the torque converter (refer to the expressions given in the block 354 in FIG. 11). In a step 355, the throttle opening degree corresponding to the desired engine torque $T_e$ and the desired engine rotation number $N_e$ as determined is searched from the throttle opening degree search map 54, whereupon the gear position and the throttle opening degree are outputted in a step 356.

Figure 12:
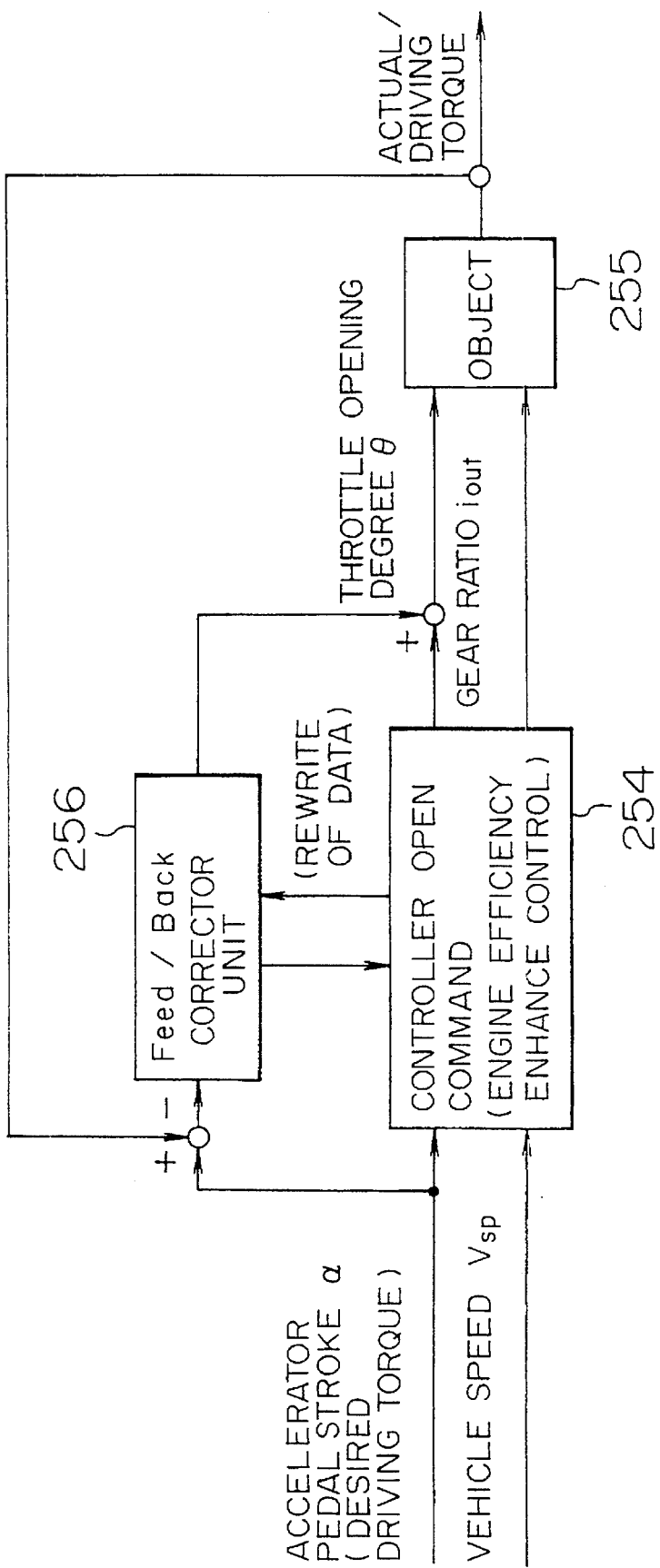
FIG. 12 is a block diagram showing schematically a general arrangement of a torque control apparatus according to a second embodiment of the invention which is added with a model feed-back control.

FIG. 12 is a block diagram showing a general arrangement of the torque control apparatus according to a second embodiment of the invention which differs from the embodiment described in the foregoing in that a model feedback control is added to the driving torque control.

In FIG. 12, a reference numeral 254 denotes a controller which is functionally equivalent to the vehicle control apparatus 100 shown in FIG. 1 and a numeral 255 designates in general an object under control such as the engine, the transmission and the like.

According to the teachings of the invention incarnated in the instant embodiment, detected values of the current vehicle speed $V_{sp}$ and the accelerator pedal stroke $\alpha$ (representing the desired driving torque) are inputted to the controller 254 for arithmetically determining the throttle opening degree and the gear ratio corresponding to the current vehicle speed $V_{sp}$ and the accelerator pedal stroke e as detected. The throttle opening degree and the gear ratio as determined are supplied to the object of concern 255 for control thereof. The controller 254 incorporates therein a model which is so prepared that the driving torque as demanded by the driver and the optimal or most economical fuel cost can be realized by taking into consideration the engine efficiency as well as the transmission efficiency. Additionally, a means for detecting the actual driving torque (e.g. torque sensor, torque estimating means and the like) is provided for the purpose of feeding back a difference between the actual driving torque and the desired driving torque to a corrector 256 for thereby allowing the gear ratio and the throttle opening degree to be corrected appropriately. More specifically, this arrangement is provided with a view to compensating for deficiency of torque which may occur transiently during the shift operation (i.e., gear ratio change-over operation) by using a correcting quantity such as the rate of change $d\alpha/dt$ of the accelerator pedal stroke $\alpha$. Further, data are transferred between the corrector 256 and the controller 254 through communication in order to rewrite or update the data used for the control purpose in view of changes in the operation state such as change as brought about as the time lapses.

By adopting the feedback control mentioned above, the desired driving torque can be made available more speedily.

Figure 13A:
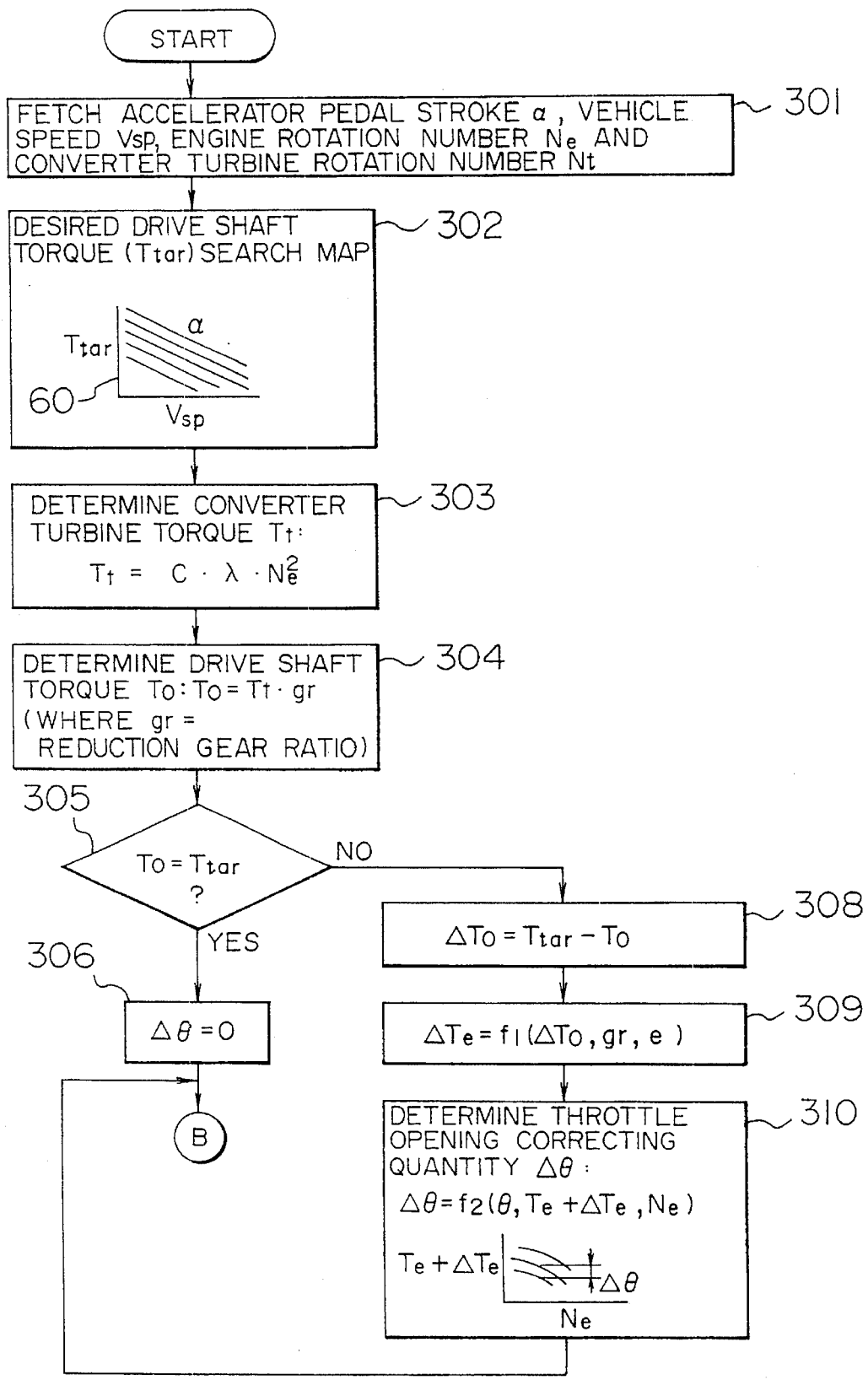

Next, operation of the torque control apparatus shown in FIG. 12 will be elucidated in detail by reference to flow charts of FIGS. 13A and 13B.

At first in a processing step 301, the accelerator pedal stroke e, the current vehicle speed $V_{sp}$, the engine rotation number $N_e$ and the torque converter turbine rotation number $N_t$ are fetched. Subsequently, in a step 302, the desired drive shaft torque $T_{tar}$ is determined as a function of the accelerator pedal stroke $\alpha$ and the current vehicle speed $V_{sp}$ by reference to a desired drive shaft torque search map 60. In a step, the torque converter turbine torque (i.e., torque converter output shaft torque) $T_t$ is determined in accordance with $$T_t = C \cdot \lambda \cdot N_e^2$$

where C represents a pump capacity coefficient which is a function of the speed ratio e, $\lambda$ represents the torque ratio and $N_e$ represents the engine rotation number (rpm). The above expression is known in the art and allows the torque converter turbine torque $T_t$ to be determined with sufficiently high accuracy. In a step 304, the converter turbine torque $T_t$ as determined is multiplied by a reduction gear ratio gr inclusive of a final gear ratio to thereby determine the drive shaft torque $T_0$. In a processing step 305, decision is made as to whether or not the drive shaft torque $T_0$ is equal to the desired drive shaft torque $T_{tar}$. When the decision in the step 305 results in affirmation (Yes), the processing proceeds to a step 306 where the throttle opening degree correcting quantity $\Delta\theta$ of zero is inputted, whereupon a processing step 307 is executed. On the other hand, when the answer of the decision step 305 is negative (No), the processing proceeds to a step 308 where a difference $\Delta T_0$ between the drive shaft torque $T_0$ and the desired drive shaft torque $T_{tar}$ is determined, which is then followed by execution of a processing step 309 where a deviation $\Delta T_e$ from the desired engine torque $T_e$ is determined in accordance with a function given by:

$$\Delta T_e = f_1(\Delta T_0, gr, e)$$

where $\Delta T_0$ represents the difference mentioned above, gr represents the aforementioned reduction gear ratio, and e represents the speed gear ratio. Finally, in a step 310, the throttle opening degree correcting quantity $\Delta\theta$ is determined in accordance with a function:

$$\Delta\theta = f_2(\theta, T_e + \Delta T_e, N_e)$$

where $\theta$, $T_e$, $\Delta T_e$ and $N_e$ represent the quantities defined hereinbefore. More concretely, the throttle opening degree correcting quantity $\Delta\theta$ can be determined by subtracting from the throttle opening degree $\theta$ determined in the step 314 of the preceding processing routine the value given by $\theta$ ($\theta$ ($T_e + \Delta T_e$, $N_e$)) and determined from the throttle opening degree search map 54, i.e., $\Delta\theta = \theta - \theta$ ($T_e + \Delta T_e$, $N_e$).

Next, in a step 307, decision is made on the basis of the current vehicle speed $V_{sp}$ determined in the step 301 and the converter turbine torque (i.e., torque converter output shaft torque, to say in another way) $T_t$ as to whether or not the lock-up state is prevailing by referencing a map 62 containing data representing a relation between the current vehicle speed $V_{sp}$ and the torque converter output shaft torque $T_t$. In this map 62, the lock-up region is shown as a hatched area. As can be seen from this map 62, lock-up is effectuated in a low converter turbine torque region in order to protect the engine against vibration.

When the lock-up is decided in the step 307, the processing proceeds to a step 311 and, if otherwise, to a step 312. In the step 311, the gear position effective for the lock-up state is determined in the manner described hereinbefore, while in the step 312, the gear position effective for the state where the torque converter is operating is determined. Thereafter, a processing step 313 is executed for determining through the map search a retrieval the gear position corresponding to the optimal fuel cost, which is then followed by a processing step 314 where the desired throttle opening degree $\theta$ is determined through the map search mentioned hereinbefore. In a succeeding step 315, the desired throttle opening degree $\theta$ is corrected by addition of the aforementioned correcting quantity $\Delta\theta$, whereupon the corrected throttle opening degree $\theta$ and the gear position $i_{out}$ are outputted.

By virtue of the feedback arrangement described above, the torque control which satisfies more satisfactorily the demand of the driver can be realized.

Incidentally, it should be added that the processing in the step 302 for determining the desired driving torque $T_{tar}$ by referencing the map 302 corresponds to the processing executed by the desired driving torque search/retrieve unit 202 described hereinbefore by reference to FIG. 2.

Figure 14:
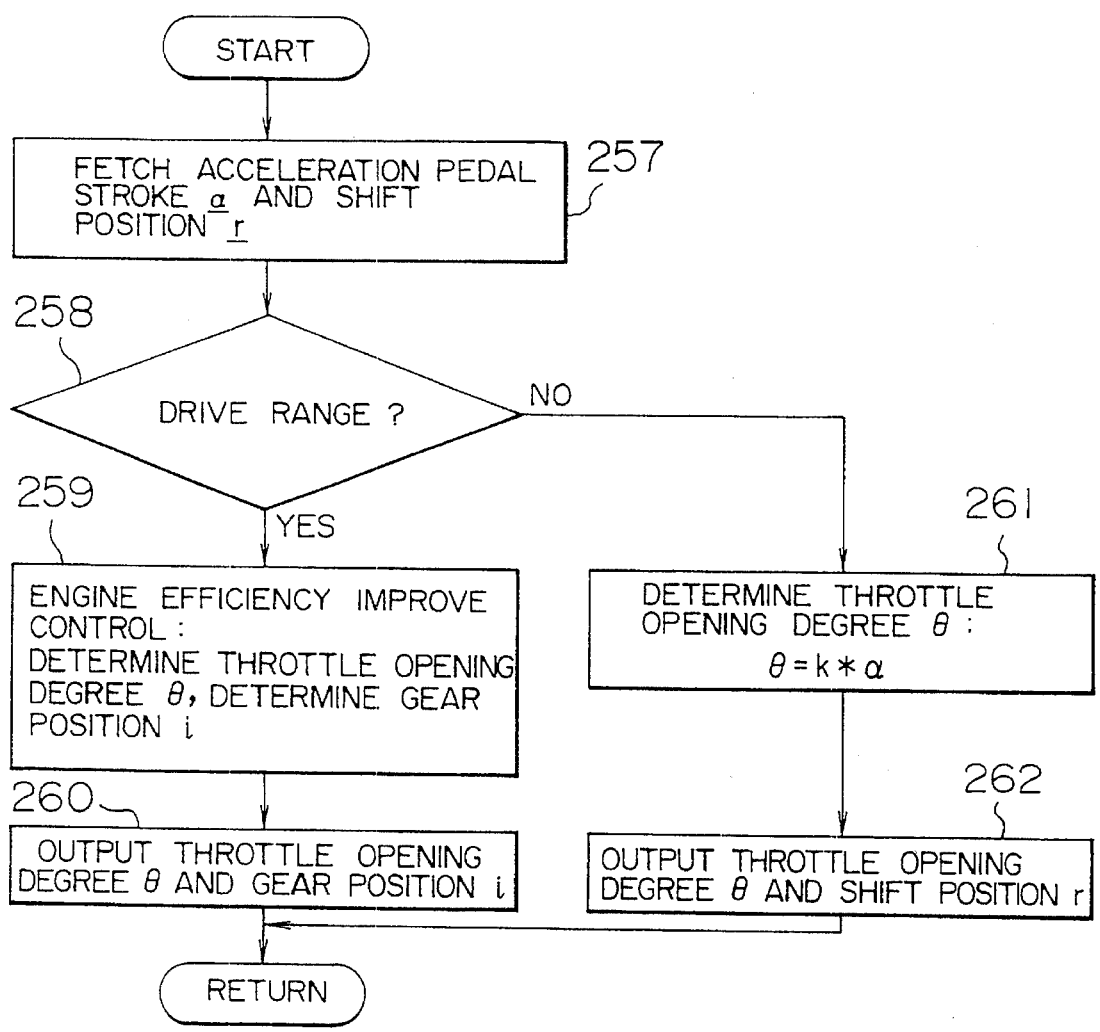
FIG. 14 shows a flow chart for illustrating a torque control procedure for a motor vehicle whose transmission gear is manipulated by means of a manual shift lever according to a third embodiment of the present invention.

FIG. 14 shows a flow chart for illustrating a torque control procedure for a motor vehicle whose transmission gear is manipulated by means of a manual shift lever according to a third embodiment of the present invention. Referring to the figure, in a step 257, detected values of the accelerator pedal stroke $\alpha$ and a shift position r are fetched. In a step 257, decision is made as to whether or not the drive range D is currently effective. When the decision step 257 results in affirmation (Yes), the throttle opening degree and the gear position are arithmetically determined for effectuating the engine efficiency improve control described hereinbefore by reference to FIGS. 4 to 9, the results of which are outputted in a step 260. On the other hand, in the other running state than that in the drive range (D), i.e., in the running state where the first speed range or the reverse range R (backward drive) is effective, the processing proceeds to a step 261 where the throttle opening degree is arithmetically determined so that the throttle opening degree bears one-to-one correspondence to the accelerator pedal stroke. In a step 262, the shift position r fetched in the step 257 and the throttle opening degree determined in the step 261 are outputted.

In this manner, according to the invention incarnated in the instant embodiment, it is taught that in a speed range such as the drive range D where a plurality of gear ratios are available, the optimal throttle opening degree and the optimal gear ratio are selected, while in the speed range where only one gear ratio is available as in the case of the reverse range (backward) R and the first speed range, selection of the gear ratio is not performed but only the optimal throttle opening degree is determined. In this conjunction, it should be mentioned that when a command for changing both the gear ratio and the throttle opening degree in the speed range where no more than one gear ratio can be used, there may unwantedly arise overrunning state of the engine because of the change of the throttle opening degree (intake air flow rate) nevertheless of no change in the gear ratio. However, according to the invention incarnated in the instant embodiment, the command for changing the gear ratio in the speed range where no more than one gear ratio can be used is not issued, whereby the problem mentioned above can be avoided in a satisfactory manner.

Figure 15:
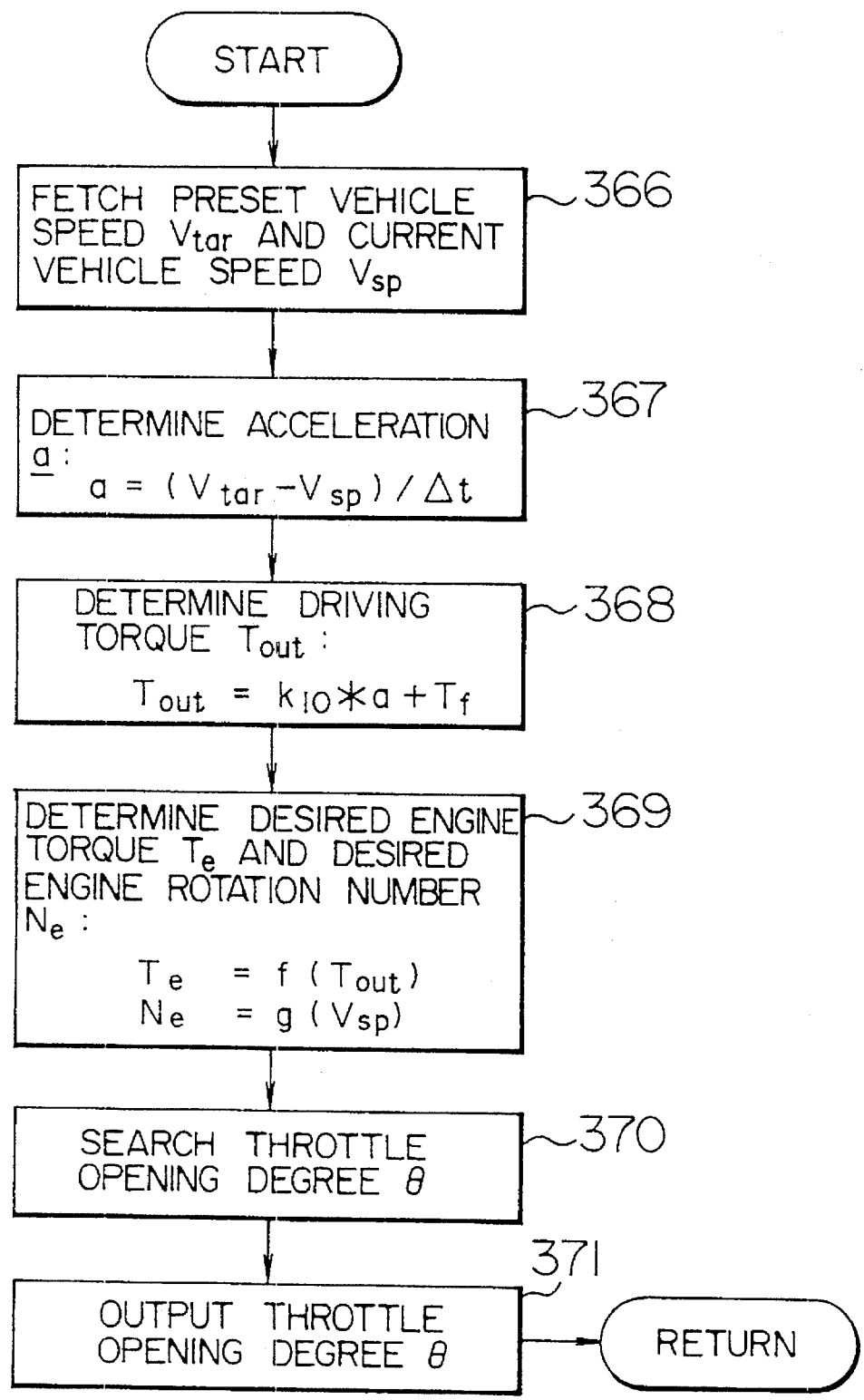
FIG. 15 is a flow chart illustrating a control procedure for performing a speed hold control for a motor vehicle.
Figure 16:
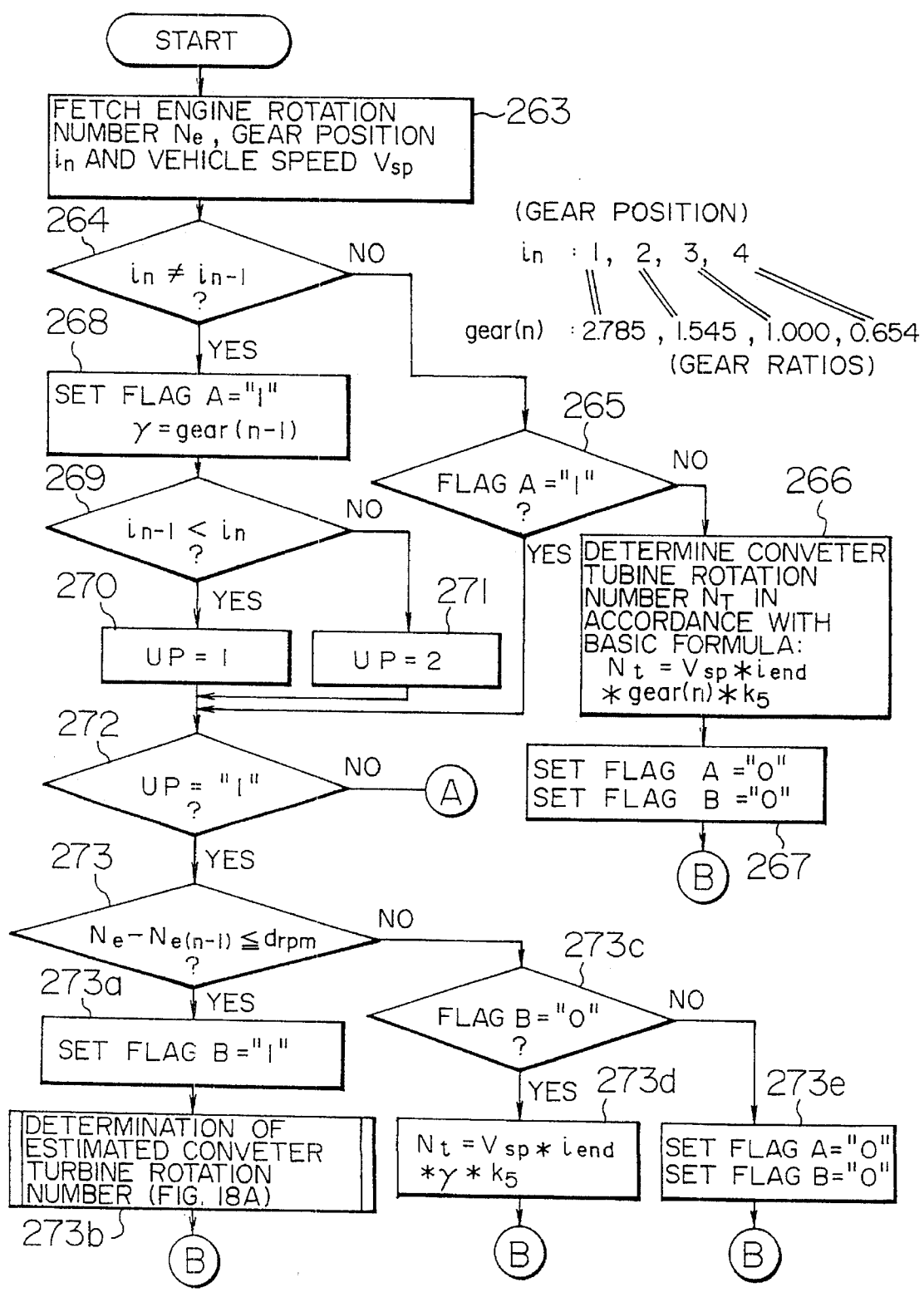
FIG. 16 shows a flow chart for illustrating a procedure for estimating a rotation number of an output shaft of a torque converter.
Figure 17:
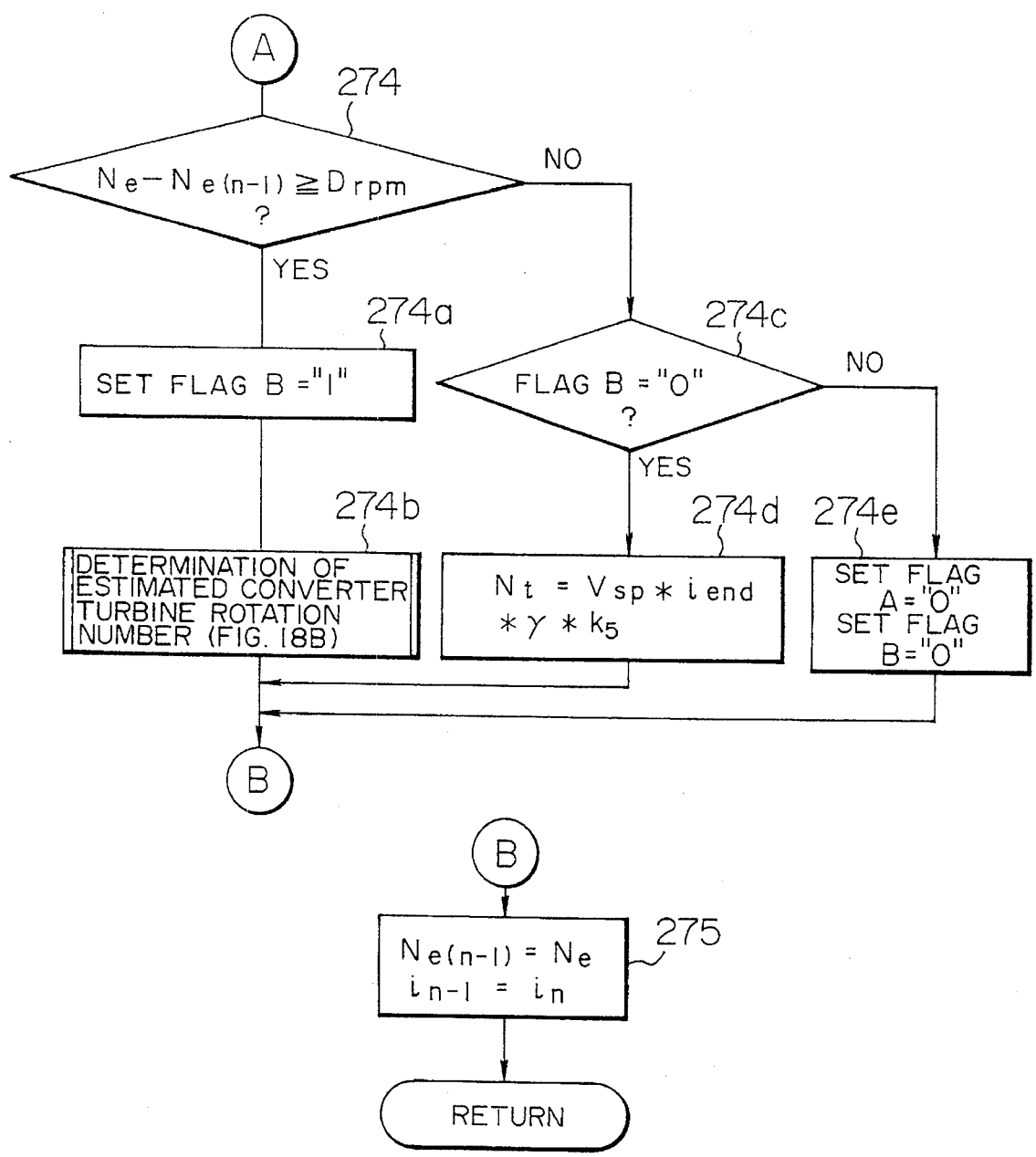
FIG. 17 shows a flow chart for illustrating a procedure for estimating a rotation number of an output shaft of a torque converter.

FIG. 15 is a flow chart for illustrating a control procedure for performing a speed hold control (i.e., control for holding the vehicle speed constant) for a motor vehicle. Referring to the figure, in a step 366, detected values of a preset vehicle speed $V_{tar}$ and a current vehicle speed $V_{sp}$, respectively, are fetched. Next, in a step 367, acceleration a is determined on the basis of the preset vehicle speed $V_{tar}$ and the current vehicle speed $V_{sp}$, i.e., $a=(V_{tar}-V_{sp})/-t$. In a step 368, a driving torque $T_{out}$ is determined by using the acceleration a in accordance with:

$$T_{out}=k_{10} \times a + T_f$$

where $T_f$ represents a running load, and $k_{10}$ represents a constant. Subsequently, in a step 369, the desired engine torque $T_e$ and the desired engine rotation number Ne are arithmetically determined as a function f of the driving torque $T_{out}$ and as a function g of the current vehicle speed $V_{sp}$, respectively. Subsequently, in a step 370, the throttle opening degree is determined by referencing a map by using the desired engine torque $T_e$ and the desired engine rotation number $N_e$. The throttle opening degree thus determined is outputted in a step 371.

Next, description will be directed to a method of estimating the rotation number of the torque converter output shaft. In order to achieve the object of the present invention by using a conventional automatic transmission, it is indispensable to obtain the rotation number of the torque converter output shaft. In this conjunction, there is commercially available a sensor for detecting the rotation number of the torque converter output shaft. According to the invention, however, the rotation number of the torque converter output shaft is estimated by a method described below without resorting to the sensor from the stand point of economy.

FIG. 16 to FIG. 18B are flow charts illustrating a procedure for realizing a method of estimating the rotation number of the torque converter output shaft. Referring to the figures, in a step 263, detected values of the current engine rotation number $N_e$, the current gear position in and the current vehicle speed $V_{sp}$, respectively, are fetched. In a step 264, the current gear position $i_n$ and the preceding gear position $i_{n-1}$ fetched in the preceding routine are compared to decide whether the former is same as the latter. When the decision in the step 264 results in affirmation (Yes), it is then decided in a step 265 whether or not a flag A is "1". Unless the flag A is "1" the processing proceeds to a step 266 where the torque converter output shaft rotation number $N_t$ is determined, whereupon contents of the flags A and B are set to "0" (zero) in a step 267, which is then followed by a step 275 shown in FIG. 17. On the other hand, when it is found in the step 264 that the current gear position $i_n$ and the preceding gear position $i_{n-1}$ differ from each other, the processing proceeds to a step 268 where the flag A is set to "1" (one) while a shift position r is determined in accordance with r=gear (n–1) where "gear" represents the gear ratio. Subsequently, it is decided in a step 269 whether the difference between the current gear position $i_n$ and the preceding gear position $i_{n-1}$ is brought about by the shift-up operation ($i_{n-1}<i_n$) or shift-down operation ($i_{n-1}>i_n$).

When the shift-up is determined in the step 269, a variable VP is set equal to "1" in a step 270, while when the shift-down is determined in the step 269, the variable VP is set equal to "2" in a step 271. Subsequently, the processing proceeds to a step 272 where it is decided whether or not UP="1". If so, then a step 273 is executed. If otherwise, the processing proceeds to a step 274 shown in FIG. 17. Through the routines extending from the step 273 to Ⓑ (FIG. 16) and from the step 274 to Ⓑ (FIG. 17), the torque converter output shaft rotation number $N_t$ is estimated.

To be more concrete, in the step 273, decision is made as to whether or not a value resulting from subtraction of the preceding engine rotation number $N_{e(n-1)}$ from the current engine rotation number $N_e$ (i.e., difference in the engine rotation number between the current time point and the preceding routine) exceeds a preset value $d_{rpm}$. When the difference in the engine rotation number is smaller than the preset value $d_{rpm}$ inclusive thereof, it is then decided that speed change has actually occurred. In that case, the flag B is set to "1" in a step 273a, which is then followed by execution of a step 273b where arithmetic processing for determining the estimated torque converter turbine rotation number (i.e., estimated torque converter output shaft rotation number) is executed. Concerning this arithmetic operation, description will be made later on by reference to FIG. 18A. On the other hand, when it is found in the step 2 that the difference in the engine rotation number is greater than the preset value $d_{rpm}$, then a step 273c is executed to decided whether the flag B is "0" When the flag B is "0", a step 273d is then executed where decision is made that the speed change has not actually occurred. Accordingly, the torque converter turbine (output shaft) rotation number $N_t$ is estimated on the basis of the preceding gear ratio. On the other hand, when it is decided in the step 273c that the flag B is not set to "0", then decision is made that the gear ratio change has been completed. Thus, in a step 273e, the flags A and B are set to "0", respectively, whereupon the processing proceeds to the procedure Ⓐ shown in FIG. 17.

Now, in a step 274, decision is made as to whether or not a value resulting from subtraction of the preceding engine rotation number $N_{e(n-1)}$ from the current engine rotation number $N_e$ (i.e., difference in the engine rotation number) is greater than a preset value $D_{rpm}$ inclusive thereof. If so, it is determined that the speed change has actually occurred, whereupon the value of the flag B is set to "1" in a step 274a. In succession, the estimated turbine rotation number (i.e., estimated torque converter output shaft rotation number which will be described hereinafter by reference to FIG. 18B) is determined in a step 274b. On the other hand, when the decision step 274 shows that the difference in the engine rotation number is smaller than the preset value $D_{rpm}$, then the processing proceeds to a step 274c where decision is made whether or not the value of the flag B is "0" (zero) If it is "0" it is then decided in a step 274d that the speed change has not actually occurred. Accordingly, the torque converter turbine (output shaft) rotation number $N_t$ is determined on the basis of the preceding gear ratio. On the other hand, when the decision step 274c results in that the flag B is not "0" it is then determined that the gear ratio change (speed change) has been completed, whereupon the flags A and B are set to "0" respectively. The processing then proceeds to a routine Ⓐ. Finally, in a step 275, the preceding engine rotation number $N_{e(n-1)}$ is replaced by the current engine rotation number with the preceding gear position $i_{n-1}$ being replaced by the current gear position $i_n$.

FIGS. 18A and 18B show turbine rotation number estimating arithmetic processings. In the estimated turbine rotation number arithmetics shown in FIG. 18A, there are performed the arithmetic operations given by the following expressions:

$$N_{tb} = V_{sp} \times \text{gear}(n) \times i_{end} \times K_6 \tag{1}$$

$$N_{tc} = N_t - N_{tb} \tag{2}$$

$$N_{eb} = V_{sp} \times \text{gear}(n) \times i_{end} \times K_7 \tag{3}$$

$$N_{ec} = N_e - N_b \tag{4}$$

$$\text{Time} = (N_{ec} \times T) / (N_{e(n-1)} - N_e) \tag{5}$$

$$DN_t = N_{tc} \Delta T / \text{Time} \tag{6}$$

$$N_t = N_t - DN_t \tag{7}$$

where $N_{tb}$ represents an estimated torque converter output shaft rotation number upon completion of speed change (gear ratio change), $N_{tc}$ represents a change in the torque converter output shaft rotation number as determined by subtracting $N_{tb}$ defined above from an estimated torque converter output shaft rotation number $N_t$ at the start of speed change operation, $N_{eb}$ represents an engine rotation number upon completion of the speed change (gear rate change), Nec represents a change in the engine rotation number as determined by subtracting $N_{eb}$ defined above from the actual engine rotation number $N_e$ at the start of the gear ratio change operation;

Time represents a time taken for the gear ratio to change, $DN_t$ represents an estimated change in the torque converter output shaft rotation number during one task (e.g. during a period of 10 msec), and $N_t$ represents the estimated torque converter output shaft rotation number (rpm).

In the specification and the drawings, the sign * represents the multiplication and so is the same as the sign "." or "x".

In the arithmetics shown in FIG. 18B, the estimated torque converter output shaft rotation number $N_t$ (rpm) can be determined through the processings similar to those shown in FIG. 18A with difference only in respect to the direction in which the rotation number changes (i.e., in the rotation number increasing direction).

Figure 19:
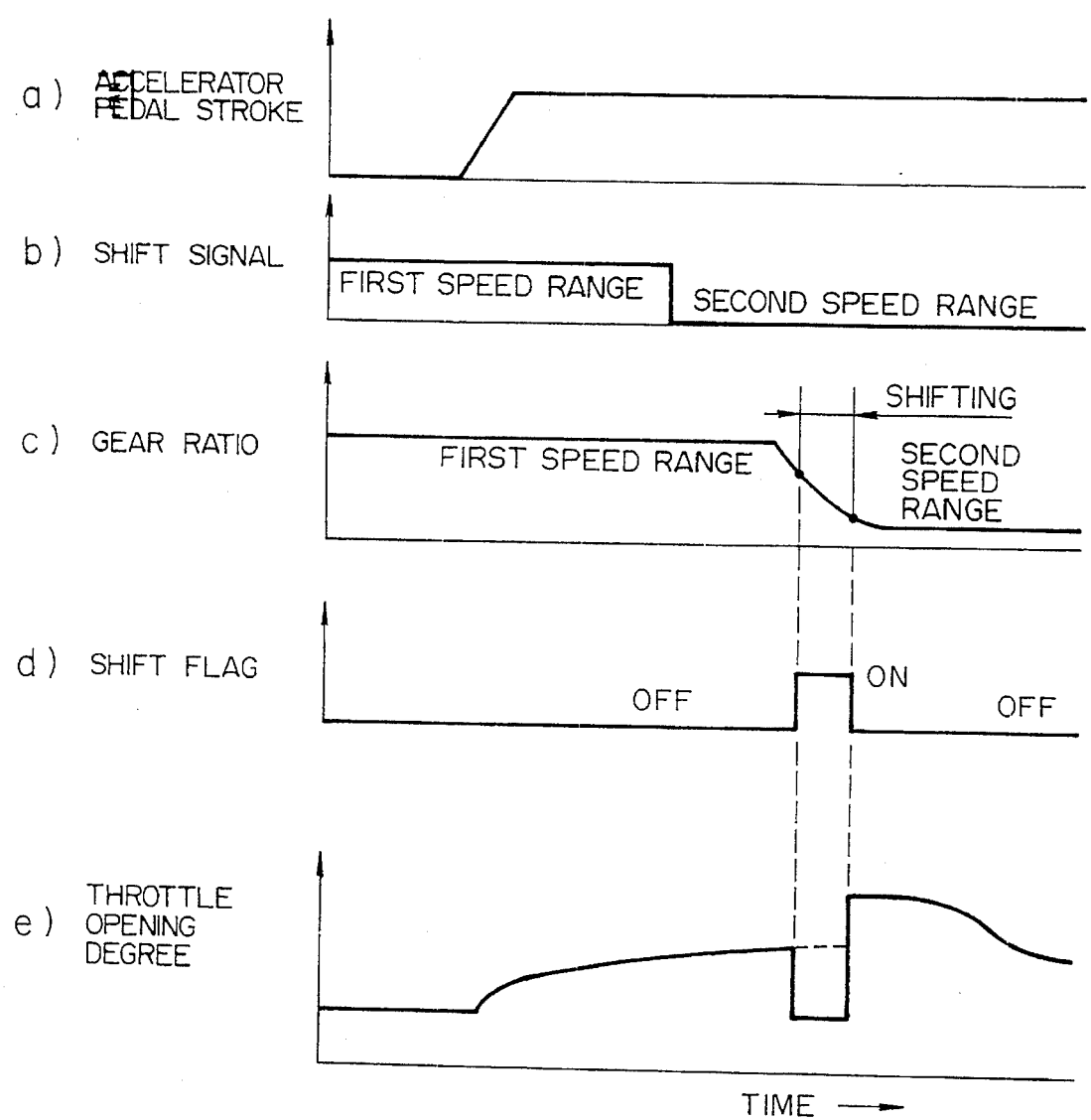
FIG. 19 is a time chart for illustrating a throttle valve control with the aid of a ratio (gear ratio) between an output shaft rotation number of a transmission gear and that of a torque converter.

FIG. 19 is a time chart for illustrating a throttle valve control with the aid of a ratio between the output shaft rotation number of the torque converter (this ratio will also be referred to as the gear ratio). After a shift signal (speed change signal) is outputted, the gear ratio is actually changed, whereby the speed change is actually effected. In the case of the instant embodiment of the invention, the throttle opening degree is controlled in accordance with the gear ratio in the shift-up manipulation. It should however be noted that the throttle opening degree can equally be controlled on the basis of the gear ratio in a similar manner in the shift-down operation. By way of example, a slice level may be provided for the change of the gear ratio, wherein a shift flag is set (ON) at the start of the gear ratio change and reset (OFF) at the end of the gear ratio change. During a period in which the shift flag is set, a throttle valve control interruption routine is performed to thereby hold or decrease the throttle opening degree so that shock due to the gear ratio change (speed change) can be evaded. Further, by making use of the gear ratio, it is equally possible to control the ignition timing and the fuel amount so that the shock due to the speed change can be prevented without executing the interruption control, while allowing the throttle valve to operate during the shifting (speed change) operation.

Figure 20:
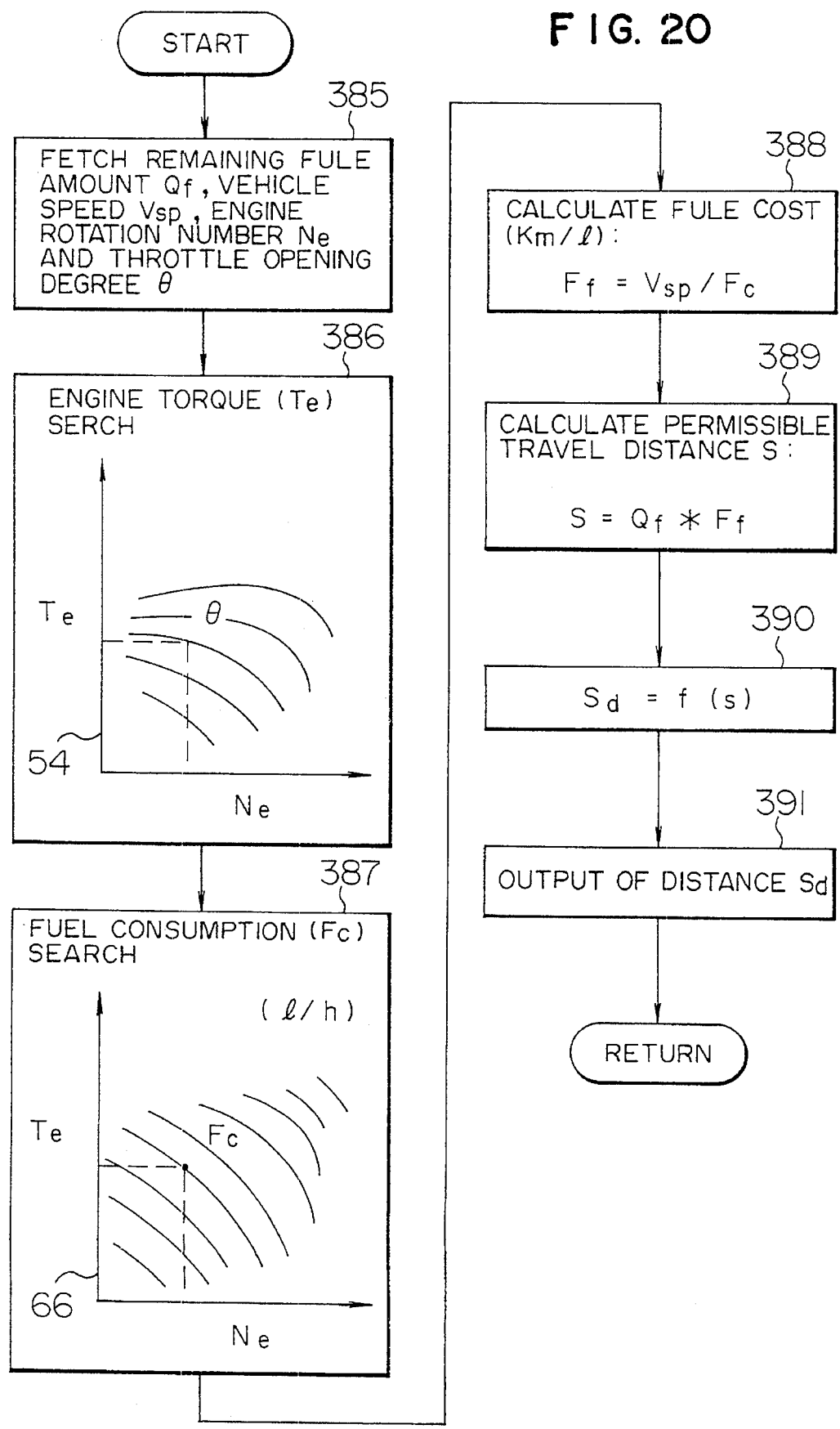
FIG. 20 is a flow chart for illustrating a control procedure according to another embodiment of the invention directed to arithmetic determination of a permissible travel distance of a motor vehicle.

FIG. 20 is a flow chart showing a control procedure according to another embodiment of the invention which is designed to arithmetically determine a permissible travel distance on the basis of a remaining fuel amount. Referring to the figure, in a step 385, detected values of the remaining fuel amount $Q_f$ as detected by a sensor provided to this end (not shown), the current vehicle speed $V_{sp}$ and the engine rotation number $N_e$ and the throttle opening degree θ are fetched. Subsequently, in a step 386, the engine torque $T_e$ is determined by referencing the throttle opening degree search map 54 by using the engine rotation number $N_e$ and the throttle opening degree θ as parameters. Then, in a step 387, a fuel consumption map 66 is referenced with the engine rotation number $N_e$ and the engine torque $T_e$ being used as parameters to thereby determine a fuel consumption $F_c$ in the current operation state of the motor vehicle. In a step 388, fuel cost $F_f$ is determined by dividing the current vehicle speed $V_{sp}$ by the fuel consumption $F_c$, which is then followed by a step 389 where a permissible travel distance S over which the motor vehicle can run with the remaining fuel amount $Q_f$ while maintaining the current operation state of the motor vehicle is determined by multiplying the remaining fuel amount Qf by the fuel cost $F_f$. Finally, in a step 390, a distance display signal $S_d$ is determined as a function f of the permissible travel distance. The display signal $S_d$ is outputted in a step 391.

FIG. 21 is a schematic diagram showing a hardware configuration of a torque control apparatus according to the invention. In the figure, an engine controller 284 and a power train controller 280 correspond to the vehicle control apparatus 100 shown in FIGS. 1 and 2. In the case of the motor vehicle control apparatuses described hereinbefore, outputs of a accelerator pedal stroke sensor 276, a shift lever sensor 277, a rotary-type vehicle speed detecting sensor 278, an engine speed sensor 285, a torque converter output shaft rotation sensor 279 and an acceleration switch 288 as well as the preset vehicle speed $V_{tar}$, the actual throttle opening degree $θ_{real}$ and the remaining fuel amount $Q_f$ are inputted to the power train controller 280 which responds to these input quantities to thereby realize the driving torque demanded by the driver by controlling correspondingly the intake air flow rate and the transmission gear ratio. On the other hand, the power train controller 280 according to the instant embodiment is designed to arithmetically determine on the basis of the various input quantities mentioned above the throttle opening degree, the gear ratio and the lock-up state, wherein the control signals generated through the arithmetic operations are supplied to a throttle valve control unit 281, a shift solenoid 282 for a transmission gear and a lock-up solenoid 283 of the torque converter. On the other hand, the engine controller 284 is supplied with an output signal of the engine speed sensor 285 and delivers an ignition signal to an ignitor 286 and a fuel injection control signal to a fuel control unit 287.

According to the teachings of the invention incarnated in the instant embodiment, the engine controller 284 is destined to perform only the ignition control and the fuel control while the power train controller 280 is in charge of the drive shaft torque control, i.e., destined to perform the throttle valve control and the transmission gear control. An advantage of this arrangement is found in that even in a design change where the engine is replaced by, for example, an electric drive motor, the power train control for the motor vehicle can be performed by exchanging only the engine controller with an electric motor control unit. In that case, it is sufficient for the power train controller to determine desired or target values for the motor torque and the motor rotation number (rpm) so that a maximum operation efficiency can be realized. On the other hand, the motor control unit is required to control only the motor current with reference to the desired or target motor current value. Of course, the latter may be replaced by the desired motor torque.

Besides, even when a fault takes place in the power train controller, the automobile can be driven to a repair shop so long as the engine control unit is sound. Thus, separate provision of the engine control unit and the power train control unit is preferred from the standpoint of safety.

To be more concrete, the power train controller 280 is so arranged that the transmission gear control and the throttle valve control are performed separately by a plurality of CPUs instead of a single shared CPU.

With the motor vehicle control configuration described above, the optimal or minimum fuel cost operation control can be achieved by inputting the output signals of the accelerator pedal stroke sensor 276 and the rotary-type vehicle speed detecting sensor 278 to the power train controller 280 for thereby allowing the power train controller 280 to arithmetically determine the throttle opening degree, the gear ratio and the lock-up state for generating the driving torque demanded by the driver so that the fuel consumption can assume a minimum point in the fuel consumption map, whereupon the control signals generated as the result of the above-mentioned arithmetic operations are supplied to the throttle valve control unit 281, the shift solenoid 282 and the lock-up solenoid 283, respectively. In the lock-up control, the power train controller 280 and the engine controller 284 transfer data with each other through communication to thereby control the ignitor 286 and the fuel control unit 287 so that torque can be prevented against fluctuation.

The accelerator pedal stroke sensor 276 is provided with an acceleration switch 288 for the purpose of monitoring constantly occurrence of abnormality in the accelerator pedal stroke sensor 276 which belongs to the power train controller 280. When abnormality takes place in the output signal of the accelerator pedal stroke sensor 276, then the output signal of the accelerator pedal stroke sensor 276 is changed over to that of the acceleration switch 288 which may indicate whether the throttle valve is fully closed or fully opened. Thus, when the accelerator pedal stroke sensor 276 suffers from a fault, the output signal of the acceleration switch 288 is utilized for driving the motor vehicle to a repair shop. Simultaneously, information concerning abnormality of the accelerator pedal stroke sensor 276 can be displayed on a display panel (or indicator).

Figure 22A:
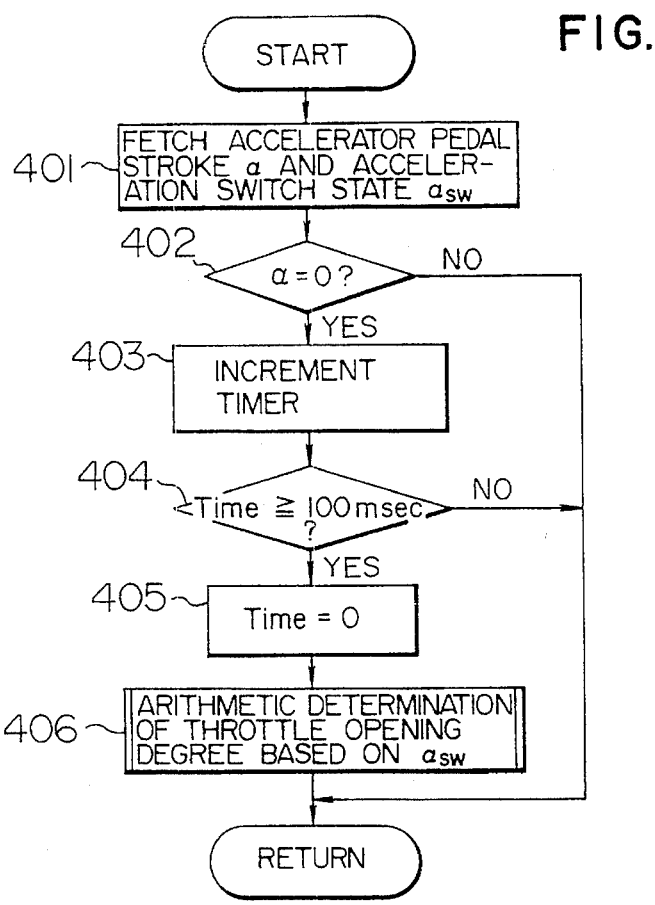
FIGS. 22A and 22B are flow charts for illustrating fail-safe operation validated upon occurrence of abnormality in an accelerator pedal stroke sensor according to another embodiment of the present invention.
Figure 22B:
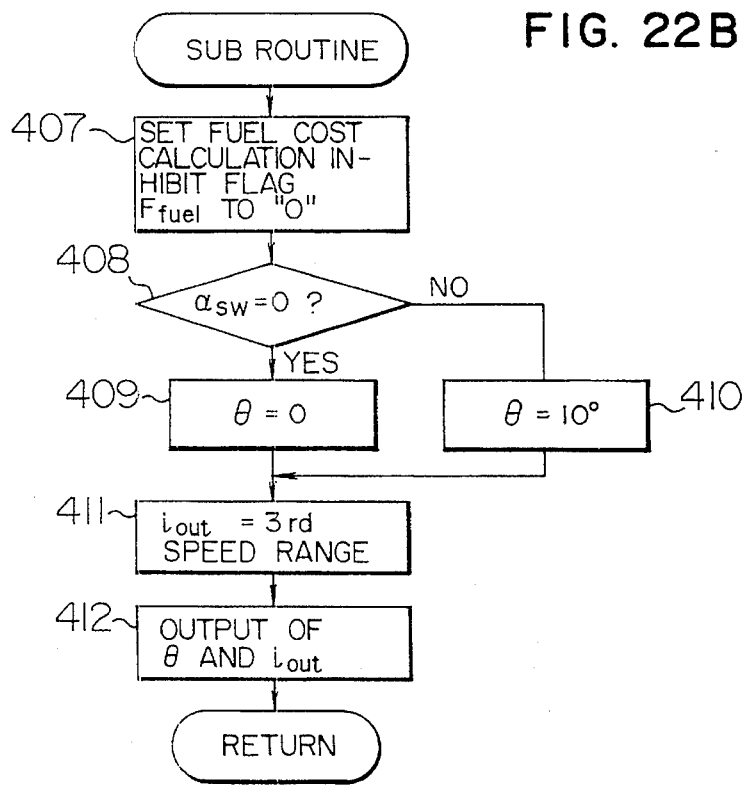

FIGS. 22A and 22B are flow charts for illustrating fail-safe operation validated upon occurrence of abnormality in the accelerator pedal stroke sensor 276.

Referring to the figures, in a processing step 401, the accelerator pedal stroke $\alpha$ and the acceleration switch output signal $\alpha_{sw}$ are fetched. In a step 402, it is decided whether the accelerator pedal stroke $\alpha$ is zero or not. Unless the accelerator pedal stroke $\alpha$ is zero, the processing returns to "START". On the other hand, if the accelerator pedal stroke $\alpha$ is zero, the processing proceeds to a step 403 to increment the value "Time" of a timer. Subsequently, in a step 404, it is decided on the basis of the value "Time" whether a predetermined time, e.g. 100 msec, has lapsed. When the accelerator pedal stroke $\alpha$ is zero even after lapse of the predetermined time, e.g. 100 msec, it is then decided that the accelerator pedal stroke sensor 276 is not normally operating. Accordingly, in a step 405, the timer is cleared, whereupon a throttle opening degree determination subroutine based on the acceleration switch output signal $\alpha_{sw}$ is validated in a step 405. Parenthetically, the timer mentioned above may be implemented as a software timer on a RAM space.

In the throttle opening degree determined subroutine mentioned above, a flag $F_{fuel}$ for inhibiting the fuel cost calculation flow is set to "0" (zero) in a step 407 because the desired drive shaft torque arithmetic operation based on the accelerator pedal stroke $\alpha$ becomes difficult. Then, the processing proceeds to a step 408 where decision is made s to whether or not the acceleration switch output signal $\alpha_{sw}$ is zero, i.e., whether the accelerator pedal is not depressed and thus the stroke thereof is zero. When the acceleration switch output signal $\alpha_{sw}$ is zero, the throttle opening degree $\theta$ is set to zero in a step 409. If otherwise, i.e., unless the accelerator pedal is depressed, the throttle opening degree $\theta$ is set to a predetermined degree, e.g. 10°, in a step 410. Subsequently, in a processing step 411, a third speed range is set, which is then followed by a step 410 where the throttle opening degree $\theta$ and the gear position iout are outputted. Normally, when the throttle opening degree $\theta$ is set to 10° in the third speed range, self-running capability of the motor vehicle can be ensured. In other words, the motor vehicle can run regardless of occurrence of abnormality in the accelerator pedal stroke sensor.

Referring to FIG. 21, in the power train controller 280, it is decided on the basis of the output signals of the accelerator pedal stroke sensor 276 and the shift lever sensor 277 whether the optimum fuel cost control is to be executed or not. When the shift lever lies in the drive range D, the minimum or optimal fuel cost control is executed in the manner described hereinbefore. On the other hand, when the shift lever is not positioned in the drive range D but in other range, e.g. in the reverse range R, it becomes necessary to set the throttle opening degree smaller than the demanded throttle opening degree detected by the accelerator pedal stroke sensor 276 in order to prevent the overrunning of the motor vehicle. In this case, the throttle opening degree is determined through a procedure differing from that described hereinbefore and outputted to the throttle valve control unit 281.

When the vehicle speed hold control (i.e., control for holding the vehicle speed constant) is carried out, the preset vehicle speed $V_{tar}$ demanded by the driver and the signal of the rotary-type vehicle speed detecting sensor 278 are inputted to the power train controller 280 which responds thereto by arithmetically determining the acceleration for changing the vehicle speed from the current value to the preset speed during a given time, to thereby control correspondingly the throttle opening degree and the gear ratio through the minimum or optimal fuel cost control procedure.

In order to mitigate the shock due to the speed change or shift, it is necessary to use the vehicle speed/output shaft rotation number ratio signal (i.e., a signal indicative of the ratio of the output of the rotary-type vehicle speed detecting sensor 278 to the output of the torque converter output shaft rotation number (speed) sensor 279, also referred to as the gear ratio signal) for controlling the throttle opening degree during the shifting operation. This can be accomplished without any difficulty in the motor vehicle which is equipped with the torque converter output shaft rotation number sensor 279. However, in the motor vehicle where the output signal of the torque converter output shaft rotation number sensor 279 is unavailable, it is necessary to estimate the rotation number of the output shaft of the torque converter. This estimation can be realized by making use of the signal of the rotary-type vehicle speed detecting sensor 278, the signal of the engine speed sensor 285 and the gear ratio determined through the minimum fuel cost control procedure.

Finally, it should be mentioned in conjunction with the instant embodiment of the invention that the optimal fuel cost can be determined for an existing motor vehicle. More specifically, on the basis of the signals used in the minimum fuel cost control (i.e., the vehicle speed signal, the engine rotation number signal, the gear ratio signal, the throttle opening degree signal and the remaining fuel amount signal Qf), the permissible travel distance can be determined in the power train controller 280. In practical applications, the travel distance mentioned above may be displayed on a display board (or indicator). Thus, the information indicating the necessity for refueling is given to the driver.

Figure 23:
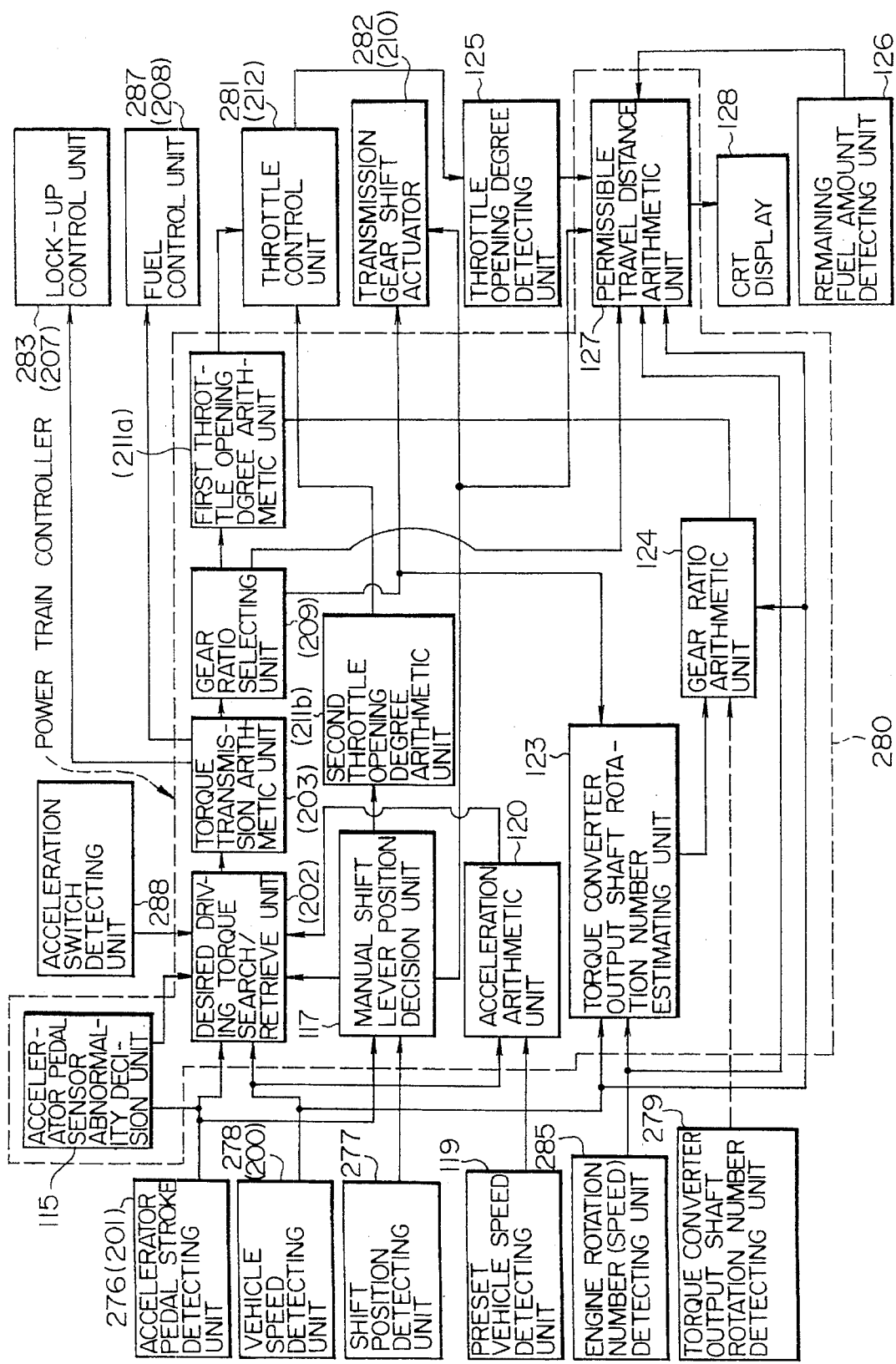
FIG. 23 is a block diagram showing a general arrangement of a torque control apparatus according to yet another embodiment of the present invention.

FIG. 23 is a block diagram showing a general arrangement of a torque control apparatus according to yet another embodiment of the present invention. Parenthetically, in the figure, the units and components serving for same or like functions as those described hereinbefore are also denoted by corresponding reference symbols in parentheses. By way of example, a throttle control unit 281 shown in FIG. 23 functionally corresponds to the throttle control unit 212 shown in FIG. 1 and 2. Further, in FIG. 23, a broken line block shows the functional configuration of the power train controller 280 shown in FIG. 21. In the minimum fuel cost control, the detection signals outputted from a accelerator pedal detecting unit 276 and a vehicle speed detecting unit 278 are inputted to the desired driving torque search/retrieve unit 202 of the power train controller 280 for determining through the search procedure the desired driving torque demanded by the driver. The value of the desired driving torque as determined is inputted to the torque transfer arithmetic unit 203 which then arithmetically determines the gear ratio and the throttle opening degree which correspond to the desired driving torque for each of the gear ratios. Further, decision is made as to whether the lock-up control is effectuated or not. If the decision results in affirmation (yes), a control signal is outputted to the lock-up control unit 283.

In the torque transfer arithmetic unit 203, the drive shaft torque is estimated on the basis of a differential value or second order differential of the vehicle speed signal for thereby detecting variation or fluctuation in torque in the lock-up control. When variation in torque is detected, a fuel control unit 287 is so controlled that the air-fuel ratio is increased (i.e., the air-fuel mixture becomes lean) for thereby suppressing the torque variation. Further, the engine rotation number and the engine torque determined by the torque transfer arithmetic unit 203 are inputted to the gear ratio selecting unit 209 for determining the gear ratio at which the fuel consumption becomes minimum. The engine torque at the gear ratio as determined as well as the engine rotation number are inputted to a first throttle opening degree arithmetic unit 211a, and a throttle opening degree signal outputted by the first throttle opening degree arithmetic unit 211a is supplied to the throttle valve control unit 281. Besides, the gear ratio determined by the gear ratio selecting unit 209 is supplied to a transmission gear shift actuator 282.

The detection signal outputted from an accelerator pedal stroke detecting unit 276 is supplied to an accelerator pedal stroke sensor abnormality decision unit 115 having the processing functions shown in FIGS. 22A and 22B, whereby it is decided by the accelerator pedal sensor abnormality decision unit 115 whether or not abnormality takes place in the accelerator pedal stroke signal. When abnormality occurs in the accelerator pedal stroke signal, the accelerator pedal sensor abnormality decision unit 115 supplies a fail signal (indicating abnormality such as breaking of wire) to the desired driving torque search/retrieve unit 202 whereby accelerator pedal stroke signal is replaced by the detection signal outputted from a acceleration switch detecting unit 288. In that case, because it is impossible to set arbitrarily the throttle opening degree, such arrangement is adopted that the throttle valve can be opened about ten degrees when the accelerator pedal stroke detecting unit 276 is put aside from the operation. Further, it is preferred to display the occurrence of abnormality in the accelerator pedal stroke detecting unit 276 on a display board (or indicator) to alarm the driver.

Subsequently, output signals of a accelerator pedal stroke detecting unit 276 and a shift lever position detecting unit 277 are supplied to a manual shift lever position decision unit 117 for allowing the latter to decide whether the minimum fuel cost control is to be executed or not. When the drive range D (where more than two gear ratios are available) is set, the minimum fuel cost control is executed. In the ranges other than the range D and in particular in the reverse (backward) range R, the throttle opening degree is set to be smaller than or equal to the demanded throttle opening degree detected by the accelerator pedal stroke detecting unit 276. In this case, the throttle opening degree is arithmetically determined by a second throttle opening degree arithmetic unit 211b, the result of which is supplied to the throttle valve control unit 281. At the same time, the manual shift lever position decision unit 117 transfers the detection signal outputted from the shift lever position detecting unit (shift lever sensor) 277 to the transmission gear shift actuator 282.

In the vehicle speed hold control (i.e., control for maintaining the vehicle speed constant), the preset vehicle speed $V_{tar}$ commanded by the driver is inputted to a preset vehicle speed detecting unit 119 while the output signal of the vehicle speed detecting unit 278 is supplied to an acceleration arithmetic unit 120, for thereby arithmetically determining the acceleration for changing the current vehicle speed to the preset vehicle speed at a predetermined rate during a given period. The acceleration thus determined is inputted to a desired driving torque search/retrieve unit 202 for calculating the desired driving torque corresponding to the acceleration inputted. Subsequently, the throttle opening degree and the gear ratio are controlled through the aforementioned minimum fuel cost control as well as the controls effectuated on the basis of the output signals of the torque transfer arithmetic unit 203, the gear ratio selecting unit 209 and the first throttle opening degree arithmetic unit 211a.

In order to mitigate the shock due to the speed change or shift, it is necessary to use the vehicle speed/output shaft rotation number ratio signal (i.e., a signal indicative of the ratio of the output of the rotary-type vehicle speed detecting sensor 278 to the output of the torque converter output shaft rotation detecting unit 279, also referred to as the gear ratio signal) for controlling the throttle opening degree during the shifting operation. This can be accomplished without any difficulty in the motor vehicle which is equipped with the torque converter output shaft rotation number detecting unit 279. However, in the motor vehicle where the output signal of the torque converter output shaft rotation number detecting unit 279 is unavailable, it is necessary to estimate the rotation number of the output shaft of the torque converter. To this end, the detection signals outputted from the vehicle speed detecting unit (vehicle speed sensor) 278 and the engine rotation number detecting unit (engine rotation sensor) 285 as well as the output signal of the gear ratio selecting unit 209 are inputted to a torque converter output shaft rotation number (speed) estimating unit 123 (which is imparted with the processing functions illustrated in FIGS. 16 and 17), to thereby estimate the torque converter output shaft rotation number. In succession, the output signal of the torque converter output shaft rotation number detecting unit 279 or that of the torque converter output shaft rotation number estimating unit 123 is inputted to a gear ratio arithmetic unit 124 for deciding whether or not the vehicle speed is being changed. If so, the throttle opening degree at which no shock makes appearance owing to the speed change is determined by the first throttle opening degree arithmetic unit 211a in dependence on the change of the gear ratio, whereby the signal representing the throttle opening degree as determined is outputted to the throttle valve control unit 281.

Subsequently, the actual throttle opening degree signal outputted from a throttle opening degree detecting unit 125 of the throttle valve control unit 281, the vehicle speed signal outputted from the vehicle speed detecting unit 278, the engine rotation number signal outputted from the engine rotation number detecting unit 285, the signal outputted from the gear ratio selecting unit 209, the gear ratio signal outputted from the manual shift lever position decision unit 117 and the signal indicative of the remaining fuel amount Qf as outputted from a remaining fuel amount detecting unit 126 are supplied to a permissible travel distance arithmetic unit 127 which responds thereto by calculating the permissible travel distance, the result of which is displayed on a display board (e.g. CRT) 128 so that the corresponding information is given to the driver.

In the control apparatus shown in FIG. 23, a lock-up control unit 283, the torque transfer arithmetic unit 203, the gear ratio selecting unit 209 and the first throttle opening degree arithmetic unit 211a are imparted with capability for executing the processings illustrated in FIGS. 1 to 8. On the other hand, the manual shift lever position decision unit 117 and the second throttle opening degree arithmetic unit 211b can execute the processing illustrated in FIG. 4. Further, the acceleration arithmetic unit 120 and the desired driving torque search/retrieve unit 202 are imparted with the functions for executing the processing illustrated in FIG. 15. The function of the gear ratio arithmetic unit 124 is to execute the processing illustrated in FIG. 19. Finally, the permissible travel distance arithmetic unit 127 serves for execution of the processing illustrated in FIG. 20.

According to the teachings of the invention incarnated in the various embodiments described above, the operation performance of the torque converter can be detected. Further, it can be determined whether or not the efficiency of transmission of the driving torque to the wheels of the motor vehicle is optimal. Thus, the fuel economy can significantly be enhanced or improved while ensuring high maneuverability of the motor vehicle as demanded by the driver.

Next, description will turn to a fourth embodiment of the invention which is directed to the torque control method for selecting the gear position corresponding to a minimum fuel cost while preventing a so-called busy shift (i.e., frequent speed changes). The hardware configuration of the instant embodiment is similar to that shown in FIG. 2 or FIG. 21.

Figure 24:
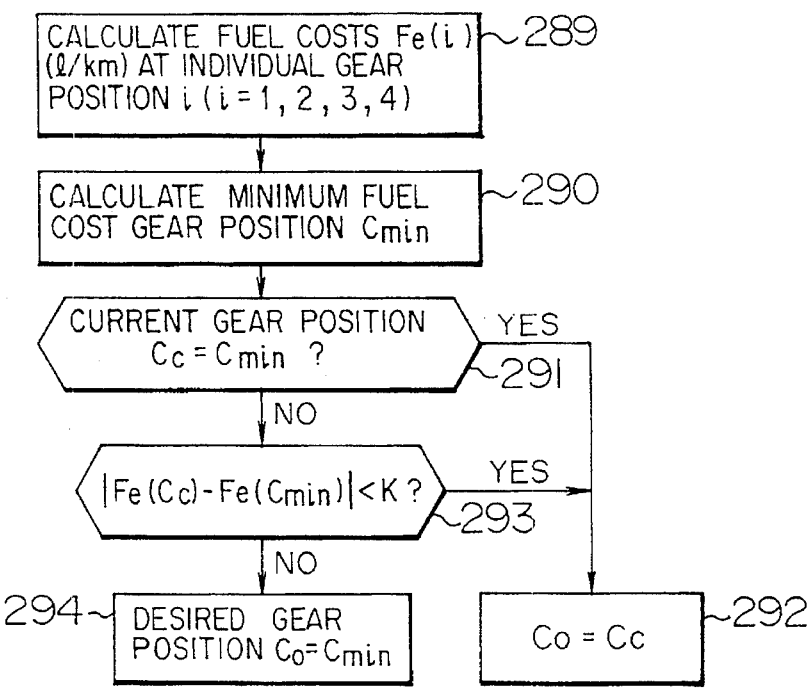
FIG. 24 is a flow chart for illustrating a torque control processing procedure according to yet another embodiment of the present invention.

FIG. 24 is a flow chart for illustrating the torque control according to the instant embodiment.

Referring to FIG. 24, in a step 289, the fuel consumption $F_{e(i)}$ are determined for every gear position i for achieving the desired driving torque. On the basis of the result of the step 289, a minimum fuel-cost gear position (speed change position) $C_{min}$ (i.e., the gear position at which the fuel cost is minimum) is determined. In a step 291, it is decided whether or not the minimum fuel-cost gear position $C_{min}$ coincides with the current gear position $C_c$ commanded to the automatic transmission gear by a control signal $C_0$. When the decision step 291 results in affirmation "Yes", indicating that $C_c = C_{min}$, the processing proceeds to a step 292, whereby the current gear position $C_c$ is maintained.

On the other hand, when the desired gear position differs from the current gear position, the decision steps 291 results in negation "No". Accordingly, the processing proceeds to a step 293 where the fuel consumption $F_e(C_c)$ at the current gear position $C_c$ is compared with the fuel consumption $F_e(C_{min})$ at the minimum fuel-cost gear position (speed change position) $C_{min}$ determined currently, to determine whether or not the absolute value of difference between $F_e(C_{min})$ and $F_e(C_{min})$ is smaller than a predetermined threshold value K. When the answer of the decision step 293 is affirmative "Yes" the current gear position $C_c$ is maintained as it is. On the contrary, when the decision step 293 results in negation "No" indicating that the absolute value mentioned above is greater than or equal to the threshold value K, the processing proceeds to a step 294 where the current gear position $C_c$ is shifted to the minimum fuel-cost gear position $C_{min}$.

As is apparent from the foregoing, change of the gear positions is not effected until the fuel cost is determined to be improved over that for the current gear position $C_c$ on the basis of the minimum fuel-cost gear positions $C_{min}$ calculated sequentially. Thus, the busy shift mentioned above can be evaded without fail.

Figure 25:
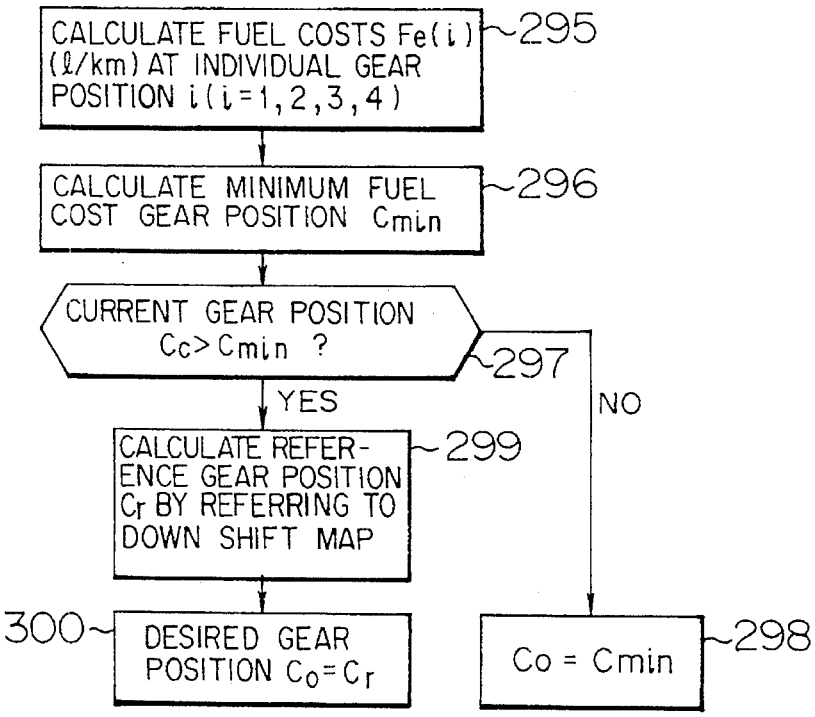
FIG. 25 is a flow chart for illustrating a torque control processing procedure according to still another embodiment of the present invention.

FIG. 25 is a flow chart for illustrating a torque control according to still another embodiment of the invention. The hardware configuration is essentially same as the one shown in FIG. 24. In the case of the embodiment shown in FIG. 14, the shifting is effectuated immediately in response to actuation of the accelerator pedal, which is favorable from the viewpoint of fuel economy but unfavorable from the standpoint of maneuverability.

In the case of the control processing illustrated in FIG. 25, importance is also put on the maneuverability of the motor vehicle. Referring to the figure, in a step 295, the fuel consumption $F_{e(i)}$ required for achieving the desired driving torque is arithmetically determined for each of the gear positions i, whereon the minimum fuel-cost gear position (speed change position) $C_{min}$ is determined in a step 296. Accordingly, the processing up to this stage is similar to that illustrated in FIG. 24.

However, in a step 297, it is decided whether or not the desired minimum fuel-cost gear position $C_{min}$ is smaller than the gear position $C_c$ inclusive thereof. When the decision step 297 results in negation "No", indicating that $C_c < C_{min}$, the processing proceeds to a step 298 where the current gear position $C_c$ is changed over to the $C_{min}$ (i.e., up-shift).

Figure 26:
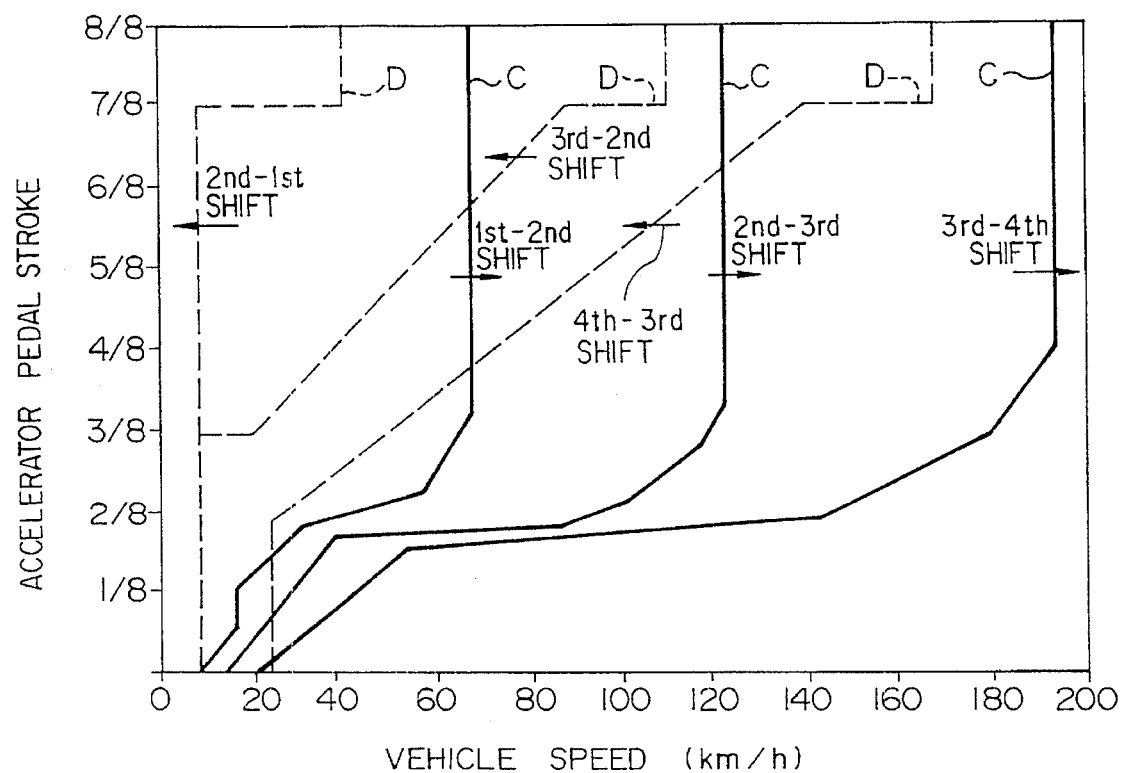
FIG. 26 is a view showing, by way of example, a down-shift map employed in the control procedure shown in FIG. 25.

On the other hand, when the answer of the decision step 297 is affirmative "Yes", meaning that $C_c > C_{min}$, the processing proceeds to a step 299 where the gear position Cr is determined by referencing a down-shift map shown in FIG. 26 with the vehicle speed $V_{sp}$ and the accelerator pedal stroke $A_{cc}$, whereupon in a step 300, the gear position $C_c$ is changed over to the gear position $C_r$ (i.e., down-shift is performed.)

Thus, according to the invention incarnated in the instant embodiment, the gear positions is so controlled that the fuel cost becomes minimum in the up-shift manipulation, whereas the gear position control in the down-shift mode is based on the down-shift map, whereby the gear position control confirming to the acceleration pedal stroke is realized in the down-shift operation.

Because it may be regarded that the fuel cost and the maneuverability are functions of the throttle opening degree and the acceleration pedal stroke, there can be realized both the improvements as to the fuel cost and the vehicle maneuverability with compatibility therebetween.

Parenthetically, it should be added that the down-shift map shown in FIG. 26 is a map employed conventionally in an automatic transmission gear ratio control system. In the figure, C represents an up-shift characteristic curve and D represents a down-shift characteristic curve as determined by the fuel cost arithmetics described above.

What is claimed is:

1. A torque control method for an internal combustion engine of a motor vehicle, wherein a value of a desired drive shaft torque for said motor vehicle is determined on the basis of at least an accelerator pedal stroke for thereby controlling a drive shaft torque of said motor vehicle so as to assume said desired drive shaft torque by controlling a gear ratio of a transmission gear coupling an output shaft of said engine to at least a drive shaft of said motor vehicle on the basis of the value of said desired drive shaft torque as determined, said method comprising the step of:

changing over procedures from one to other for determining a gear ratio of said transmission gear and a flow rate of intake air fed to said internal combustion engine in dependence on whether or not a torque transfer mechanism coupling the output shaft of said internal combustion engine to an input shaft of said transmission gear is in a lock-up state in which said output shaft and said input shaft are coupled directly without slip.

2. A torque control method for an internal combustion engine of a motor vehicle, wherein a value of a desired drive shaft torque for said motor vehicle is determined on the basis of at least an accelerator pedal stroke for thereby controlling a drive shaft torque of said motor vehicle so as to assume said desired drive shaft torque by controlling a gear ratio of a transmission gear coupling an output shaft of said engine to at least a drive shaft of said motor vehicle on the basis of the value of said desired drive shaft torque as determined, said method comprising the step of:

(a) determining a gear ratio of said transmission gear and a flow rate of intake air fed to said internal combustion engine through different procedures in dependence on whether or not a torque transfer mechanism coupling the output shaft of said internal combustion engine to an input shaft of said transmission gear is in a lock-up state in which said output shaft and said input shaft are coupled directly without slip; and (b) controlling said drive shaft torque of said motor vehicle so that it assumes said desired drive shaft torque by controlling said transmission gear and engine intake air flow rate such that said determined gear ratio and said determined intake air flow rate can be realized.

3. A torque control method for an internal combustion engine according to claim 2, wherein said step (a) includes:

a sub-step (a-1) of determining at least one gear ratio at which said determined desired drive shaft torque can be realized at a detected value of vehicle speed of said motor vehicle; and a sub-step (a-2) of selecting one of the gear ratios as determined at which an optimal fuel cost can be achieved.

4. A torque control method for an internal combustion engine according to claim 3, wherein in said sub-step (a-2), a map prescribing relations at least among values corresponding to the desired drive shaft torques, the gear ratios of said transmission gear and the flow rates of the intake air fed to said engine is searched on the basis of said determined desired drive shaft torque to thereby select from said gear ratios a gear ratio at which said optimal fuel cost can be achieved.

5. A torque control method for an internal combustion engine according to claim 4, wherein said step (a) includes a sub-step in which a map prescribing relations at least between values corresponding to the desired drive shaft torques and the intake air flow rates is searched on the basis of the gear ratio selected in said sub-step (a-2) to thereby determine the intake air flow rate for said engine.

6. A torque control method for an internal combustion engine according to claim 2, wherein when said torque transfer mechanism is in the lock-up state, said step (a) includes the sub-steps of:

(a-1) determining engine rotation numbers for every gear ratio of said transmission gear on the basis of a detected value of said vehicle speed and the gear ratios which said transmission gear has;

(a-2) determining engine torques for every gear ratio of said transmission gear on the basis of said determined desired drive shaft torque and the gear ratios which said transmission gear has;

(a-3) determining at least one gear ratio on the basis of the engine rotation numbers determined for every gear ratio of said transmission gear and the engine torque; and (a-4) selecting a gear ratio from those determined in said sub-step (a-3) at which an optimal fuel cost can be realized.

7. A torque control method for an internal combustion engine according to claim 6, wherein said step (a) further includes:

a sub-step (a-5) in which a map prescribing relations existing among the engine rotation numbers, the engine torques and the intake air flow rates is searched on the basis of the gear ratio selected in said sub-step (a-4) to thereby determine the intake air flow rate.

8. A torque control method for an internal combustion engine according to claim 2, wherein unless said torque transfer mechanism is in the lock-up state, said step (a) includes the sub-steps of:

(a-1) determining output shaft rotation numbers of said torque transfer mechanism for every gear ratio of said transmission gear on the basis of a detected value of said vehicle speed and the gear ratios which said transmission gear has;

(a-2) determining output shaft torques of said torque transfer mechanism for every gear ratio of said transmission gear on the basis of said determined desired drive shaft torque and the gear ratios which said transmission gear has;

(a-3) determining engine rotation numbers and engine torques for every gear ratio of said transmission gear on the basis of said determined output shaft torque, said output shaft rotation number of said torque transfer mechanism and torque transfer characteristics of said torque transfer mechanism;

(a-4) determining at least one gear ratio on the basis of the engine rotation number and said engine torque as determined; and (a-5) selecting a gear ratio from those determined in said sub-step (a-4) at which an optimal fuel cost can be realized.

9. A torque control method for an internal combustion engine according to claim 8, wherein said step (a) further includes:

a sub-step (a-6) in which a map prescribing relations existing among the engine rotation numbers, the engine torques and the intake air flow rates is searched on the basis of the gear ratio selected in said sub-step (a-5) to thereby determine the intake air flow rate.

10. A torque control method for an internal combustion engine of a motor vehicle, comprising the steps of:

(a) determining a value of a desired drive shaft torque of said motor vehicle on the basis of at least an accelerator pedal stroke;

(b) determining on the basis of the determined value of said desired drive shaft torque a gear ratio of a transmission gear coupling an output shaft of said engine to at least a drive shaft of said motor vehicle and a flow rate of intake air fed to said engine;

(c) determining a value corresponding to an actual drive shaft torque of said motor vehicle;

(d) correcting at least either one of said gear ratio or said intake air flow rate obtained in said step (b) with a deviation of the value determined in said step (c) from said determined desired drive shaft torque; and (e) controlling the drive shaft torque of said motor vehicle so that said drive shaft torque assumes said desired drive shaft torque by controlling said transmission gear and said intake air flow rate so that said gear ratio and intake air flow rate as corrected can be realized.

11. A torque control method for an internal combustion engine of a motor vehicle, comprising the steps of:

(a) determining a value of a desired drive shaft torque of said motor vehicle on the basis of at least an accelerator pedal stroke;

(b) determining on the basis of the determined value of said desired drive shaft torque a gear ratio of a transmission gear coupling an output shaft of said engine to at least a drive shaft of said motor vehicle and a flow rate of intake air fed to said engine; and (c) controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said step (b) includes a sub-step in which when a current manual shift range of said transmission gear includes a plurality of gear ratios belonging thereto, a gear ratio which allows an optimal fuel cost to be realized is selected from said plurality of gear ratios.

12. A torque control method for an internal combustion engine of a motor vehicle, comprising the steps of:

(a) determining a value of a desired drive shaft torque of said motor vehicle on the basis of at least an accelerator pedal stroke;

(b) determining on the basis of the determined value of said desired drive shaft torque a gear ratio of a transmission gear coupling an output shaft of said engine to at least a drive shaft of said motor vehicle and a flow rate of intake air fed to said engine; and (c) controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said step (b) includes a sub-step in which when a current manual shift range of said transmission gear includes only one gear ratio, said one gear ratio is selected and fixed, and only the intake air flow rate is controlled on the basis of said determined value of the desired drive shaft torque or said accelerator pedal stroke.

13. A torque control method for an internal combustion engine of a motor vehicle, comprising the steps of:

(a) determining a value of a desired drive shaft torque of said motor vehicle on the basis of at least an accelerator pedal stroke;

(b) determining on the basis of the determined value of said desired drive shaft torque a gear ratio of a transmission gear coupling an output shaft of a torque converter having an input shaft coupled to an output shaft of said engine and a flow rate of intake air fed to said engine; and (c) controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said step (b) includes a sub-step (b-1) in which when said transmission gear is being manipulated for speed change, the intake air flow rate is controlled on the basis of ratio between a detected value of the output shaft rotation number of said transmission gear and the output shaft rotation number of said torque converter.

14. A torque control method for an internal combustion engine according to claim 13, wherein in said sub-step (b-1), the output shaft rotation number of said torque converter is determined on the basis of a detected value of the output shaft rotation number of said transmission gear and a detected value of an input shaft rotation number of said torque converter.

15. A torque control method for an internal combustion engine of a motor vehicle, comprising the steps of:

(a) determining a value of a desired drive shaft torque of said motor vehicle on the basis of at least an accelerator pedal stroke;

(b) determining on the basis of the determined value of said desired drive shaft torque a gear ratio of a transmission gear coupling an output shaft of a torque converter having an input shaft coupled to an output shaft of said engine and a flow rate of intake air fed to said engine; and (c) controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said step (b) includes the sub-steps of:

(b-1) determining whether or not speed change operation is being performed on said transmission gear on the basis of a ratio between a detected value of the output shaft rotation number of said transmission gear and the output shaft rotation number of said torque converter; and (b-2) controlling the intake air flow rate by using a ratio between the detected value of the output shaft rotation number of said transmission gear and the output shaft rotation number said torque converter, when it is determined in said sub-step (b-1) that speed change is being carried out.

16. A torque control method for an internal combustion engine of a motor vehicle, comprising the steps of:

(a) determining a value of a desired drive shaft torque of said motor vehicle on the basis of at least a detected value of accelerator pedal stroke outputted from an accelerator pedal stroke sensor;

(b) determining on the basis of the determined value of said desired drive shaft torque a gear ratio of a transmission gear coupling an output shaft of said engine to at least a drive shaft of said motor vehicle and a flow rate of intake air fed to said engine; and (c) controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said step (a) includes a sub-step (a-1) in which when said accelerator pedal stroke sensor is abnormal, the desired drive shaft torque is determined on the basis of a detection signal outputted from detecting means capable of outputting a detection signal equivalent to that of said accelerator pedal stroke sensor.

17. A torque control method for an internal combustion engine according to claim 16, wherein an acceleration switch outputting said detection signal by detecting whether said accelerator pedal stroke is zero or not is employed as said detecting means.

18. A torque control method for an internal combustion engine according to claim 17, wherein in said sub-step (a-1), an opening degree of a throttle valve is set to zero when said acceleration switch indicates the accelerator pedal stroke of zero, and if otherwise, the opening degree of said throttle valve is set at a predetermined angle greater than zero degree with said transmission gear being set to a predetermined gear ratio.

19. A torque control method for an internal combustion engine of a motor vehicle, comprising the steps of:

(a) determining a value of a desired drive shaft torque of said motor vehicle on the basis of at least an accelerator pedal stroke;

(b) determining on the basis of the determined value of said desired drive shaft torque a gear ratio of a transmission gear coupling an output shaft of said engine to at least a drive shaft of said motor vehicle and a flow rate of intake air fed to said engine; and (c) controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said step (b) includes the sub-steps of:

(b-1) selecting the gear ratio at which an optimal fuel cost can be achieved on the basis of at least said determined desired drive shaft torque; and (b-2) when an absolute value of difference between a fuel consumption at the current gear ratio and a fuel consumption at the gear ratio selected in said sub-step (b-1) exceeds a predetermined value, the current gear ratio is changed over to the gear ratio selected in said sub-step (b-1).

20. A torque control method for an internal combustion engine according to claim 19, wherein said step (b) includes a sub-step (b-3) in which a current gear ratio is maintained as it is when an absolute value of difference between the fuel consumption at the current gear ratio and the fuel consumption at the gear ratio selected in said sub-step (b-1) is smaller than a predetermined value.

21. A torque control method for an internal combustion engine of a motor vehicle, comprising the steps of:

(a) determining a value of a desired drive shaft torque of said motor vehicle on the basis of at least an accelerator pedal stroke;

(b) determining on the basis of the determined value of said desired drive shaft torque a flow rate of intake air fed to said engine;

(c) selecting a gear ratio allowing an optimal fuel cost to be realized on the basis of at least said desired drive shaft torque as determined, when a transmission gear coupling an output shaft of said engine to a drive shaft of said motor vehicle is shifted upward;

(d) selecting a gear ratio by searching a map prescribing relations among the accelerator pedal strokes, the vehicle speeds or the engine rotation numbers and the gear ratios on the basis of the accelerator pedal stroke and said vehicle speed or said engine rotation number, when said transmission gear is being shifted downward; and (e) controlling the drive shaft torque of said motor vehicle so that it assumes said desired drive shaft torque by controlling said transmission gear and said intake air flow rate such that the gear ratio selected in said step (c) or (d) and the intake air flow rate determined in said step (b) can be realized.

22. A torque control method for an internal combustion engine of a motor vehicle, comprising the steps of:

(a) determining a value of a desired drive shaft torque of said motor vehicle on the basis of at least an accelerator pedal stroke;

(b) determining on the basis of the determined value of said desired drive shaft torque a flow rate of intake air fed to said engine;

(c) selecting a gear ratio allowing an optimal fuel cost to be realized at least on the basis of said desired drive shaft torque as determined; and (d) controlling the drive shaft torque of said motor vehicle so that it assumes said desired drive shaft torque by controlling said transmission gear and said intake air flow rate so that the gear ratio selected in said step (c) or (d) and the intake air flow rate determined in said step (b) can be realized;

wherein said gear ratio is selected with at least said accelerator pedal stroke as a parameter, when said transmission gear is being shifted downward, while in upward shifting of said transmission gear, said gear ratio is selected at least with the opening degree of the throttle valve being used as a parameter.

23. A torque control apparatus for an internal combustion engine of a motor vehicle, in which a value of a desired drive shaft torque for said motor vehicle is determined on the basis of at least an accelerator pedal stroke for thereby controlling a drive shaft torque of said motor vehicle so as to assume said desired drive shaft torque by controlling a gear ratio of a transmission gear coupling an output shaft of said engine to at least a drive shaft of said motor vehicle on the basis of the value of said desired drive shaft torque as determined, said apparatus comprising:

decision means for deciding whether or not a torque transfer mechanism coupling an output shaft of said engine and an input shaft of said transmission gear is in a lock-up state in which said input shaft and said output shaft are directly coupled without slip;

first arithmetic means responsive to the decision that said torque transfer mechanism is in said lock-up state, to thereby arithmetically determine a gear ratio of said transmission gear and a flow rate of intake air fed to said engine on the basis of a value of said desired drive shaft torque as determined through a first procedure;

second arithmetic means responsive to the decision that said torque transfer mechanism is not in said lock-up state, to thereby arithmetically determine a gear ratio of said transmission gear and a flow rate of intake air fed to said engine on the basis of a value of said desired drive shaft torque as determined through a second procedure which differs from said first procedure; and control means for controlling said drive shaft torque of said motor vehicle so that it assumes the value of said desired drive shaft torque by controlling said transmission gear and said engine intake air flow rate such that said gear ratio and said intake air flow rate as determined can be realized.

24. A torque control apparatus for an internal combustion engine according to claim 23, wherein each of said first and second arithmetic means includes:

means for determining at least one gear ratio at which said determined desired drive shaft torque and a detected value of vehicle speed of said motor vehicle can be realized; and selecting means for selecting one gear ratio from said determined gear ratios at which an optimal fuel cost can be achieved.

25. A torque control apparatus for an internal combustion engine according to claim 24, wherein said selecting means includes:

a map prescribing relations at least among values corresponding to the desired drive shaft torques, the gear ratios of said transmission gear and the flow rates of the intake air fed to said engine; and map search means for searching said map on the basis of said determined desired drive shaft torque to thereby select from said gear ratios a gear ratio at which said optimal fuel cost can be achieved.

26. A torque control apparatus for an internal combustion engine according to claim 25, each of said first and second arithmetic means includes:

a map prescribing relations at least between values corresponding to the desired drive shaft torques and the intake air flow rates; and means for searching said map on the basis of the gear ratio selected by said selecting means to thereby determine the intake air flow rate for said engine.

27. A torque control apparatus for an internal combustion engine according to claim 23, said first arithmetic means includes:

engine rotation number determining means for determining engine rotation numbers for every gear ratio of said transmission gear on the basis of a detected value of said vehicle speed and the gear ratios which said transmission gear has;

engine torque determining means for determining engine torques for every gear ratio of said transmission gear on the basis of said determined desired drive shaft torque and the gear ratios which said transmission gear has;

gear ratio determining means for determining at least one gear ratio on the basis of the engine rotation numbers determined for every gear ratio of said transmission gear and said engine torques; and gear ratio selecting means for selecting from those determined by said gear ratio determining means a gear ratio at which an optimal fuel cost can be achieved.

28. A torque control apparatus for an internal combustion engine according to claim 27, wherein said first arithmetic means further includes:

a map prescribing relations existing among the engine rotation numbers, the engine torques and the intake air flow rates; and intake air flow rate determining means for searching said map on the basis of the gear ratio selected by said gear ratio selecting means and allowing the optimal fuel cost to be achieved, to thereby determine the intake air flow rate.

29. A torque control apparatus for an internal combustion engine according to claim 23, said second arithmetic means includes:

output shaft rotation number determining means for determining output shaft rotation numbers of said torque transfer mechanism for every gear ratio of said transmission gear on the basis of a detected value of said vehicle speed and the gear ratios which said transmission gear has;

output shaft torque determining means for determining output shaft torques of said torque transfer mechanism for every gear ratio of said transmission gear on the basis of said determined desired drive shaft torque and the gear ratios which said transmission gear has;

engine rotation number/engine torque determining means for determining engine rotation numbers and engine torques for every gear ratio of said transmission gear on the basis of said determined output shaft torque and said output shaft rotation number of said torque transfer mechanism and torque transfer characteristics of said torque transfer mechanism;

gear ratio determining means for determining at least one gear ratio on the basis of the engine rotation number and said engine torque as determined; and selecting means for selecting from those determined by said gear ratio determining means a gear ratio at which an optimal fuel cost can be realized.

30. A torque control apparatus for an internal combustion engine according to claim 29, wherein said second arithmetic means further includes:

a map prescribing relations existing among the engine rotation numbers, the engine torques and the intake air flow rates; and intake air flow rate determining means for searching said map on the basis of the gear ratio selected by said gear ratio selecting means to thereby determine the intake air flow rate.

31. A torque control apparatus for an internal combustion engine of a motor vehicle, comprising:

means for determining a value of a desired drive shaft torque of said motor vehicle on the basis of at least an accelerator pedal stroke;

means for determining on the basis of the determined value of said desired drive shaft torque a gear ratio of a transmission gear coupling an output shaft of said engine and at least a drive shaft of said motor vehicle and a flow rate of intake air fed to said engine;

means for determining a value corresponding to an actual drive shaft torque of said motor vehicle;

means for correcting at least either one of said gear ratio or said intake air flow rate with a deviation of said determined value of the actual drive shaft torque from said determined desired drive shaft torque; and means for controlling the drive shaft torque of said motor vehicle so that said drive shaft torque assumes said desired drive shaft torque by controlling said transmission gear and said intake air flow rate so that said gear ratio and intake air flow rate as corrected can be realized.

32. A torque control apparatus for an internal combustion engine of a motor vehicle, comprising:

desired drive shaft torque determining means for determining a value of a desired drive shaft torque of said motor vehicle on the basis of at least an accelerator pedal stroke;

gear ratio/intake air flow rate determining means for determining on the basis of the determined value of said desired drive shaft torque a gear ratio of a transmission gear coupling an output shaft of said engine to at least a drive shaft of said motor vehicle and a flow rate of intake air fed to said engine; and drive shaft torque control means for controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said gear ratio/intake air flow rate determining means includes gear ratio selecting means for selecting a gear ratio which allows an optimal fuel cost to be realized from said plurality of gear ratios when a current manual shift range of said transmission gear includes a plurality of gear ratios belonging thereto.

33. A torque control apparatus for an internal combustion engine of a motor vehicle, comprising:

means for determining a value of a desired drive shaft torque of said motor vehicle on the basis of at least an accelerator pedal stroke;

gear ratio/intake air flow rate determining means for determining on the basis of the determined value of said desired drive shaft torque a gear ratio of a transmission gear coupling an output shaft of said engine and at least a drive shaft of said motor vehicle and a flow rate of intake air fed to said engine; and means for controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said gear ratio/intake air flow rate determining means includes:

control means for controlling only the intake air flow rate on the basis of said determined value of the desired drive shaft torque or said accelerator pedal stroke when a current manual shift range of said transmission gear includes only one gear ratio, while said one gear ratio is set fixedly.

34. A torque control apparatus for an internal combustion engine of a motor vehicle, comprising:

means for determining a value of a desired drive shaft torque of said motor vehicle on the basis of at least an accelerator pedal stroke;

gear ratio/intake air flow rate determining means for determining on the basis of the determined value of said desired drive shaft torque a gear ratio of a transmission gear coupling an output shaft of a torque converter having an input shaft coupled to an output shaft of said engine and a flow rate of intake air fed to said engine; and control means for controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said gear ratio/intake air flow rate determining means includes means for controlling said intake air flow rate on the basis of ratio between a detected value of the output shaft rotation number of said transmission gear and the output shaft rotation number of said torque converter, when said transmission gear is being manipulated for speed change.

35. A torque control apparatus for an internal combustion engine according to claim 34, wherein said gear ratio/intake air flow rate determining means includes means for determining the output shaft rotation number of said torque converter on the basis of a detected value of the output shaft rotation number of said transmission gear and a detected value of an input shaft rotation number of said torque converter.

36. A torque control apparatus for an internal combustion engine of a motor vehicle, comprising:

means for determining a value of a desired drive shaft torque of said motor vehicle on the basis of at least an accelerator pedal stroke;

gear ratio/intake air flow rate determining means for determining on the basis of the determined value of said desired drive shaft torque a gear ratio of a transmission gear coupling an output shaft of a torque converter having an input shaft to an output shaft of said engine and a flow rate of intake air fed to said engine; and control means for controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said gear ratio/intake air flow rate determining means includes:

means for determining whether or not speed change operation is being performed on said transmission gear on the basis of a ratio between a detected value of the output shaft rotation number of said transmission gear and the output shaft rotation number of said torque converter; and means for controlling the intake air flow rate by using a ratio between the detected value of the output shaft rotation number of said transmission gear and the output shaft rotation number said torque converter when it is determined that speed change is being carried out.

37. A torque control apparatus for an internal combustion engine of a motor vehicle, comprising:

desired drive shaft torque determining means for determining a value of a desired drive shaft torque of said motor vehicle on the basis of at least a detected value of accelerator pedal stroke outputted from an accelerator pedal stroke sensor;

gear ratio/intake air flow rate determining means for determining on the basis of the determined value of said desired drive shaft torque a gear ratio of a transmission gear coupling an output shaft of said engine to at least a drive shaft of said motor vehicle and a flow rate of intake air fed to said engine; and control means for controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said desired drive shaft torque determining means includes means for determining said desired drive shaft torque on the basis of a detection signal outputted from detecting means capable of outputting a detection signal equivalent to that of said accelerator pedal stroke sensor, when said accelerator pedal stroke sensor is abnormal.

38. A torque control apparatus for an internal combustion engine according to claim 37, wherein said desired drive shaft torque determining means includes an acceleration switch which outputs said detection signal by detecting whether said accelerator pedal stroke is zero or not.

39. A torque control apparatus for an internal combustion engine according to claim 37, wherein said desired drive shaft torque determining means includes:

means for setting an opening degree of a throttle valve to zero when said acceleration switch indicates the accelerator pedal stroke of zero; and means for setting the opening degree of said throttle valve to a predetermined angle greater than zero degree while setting said transmission gear to a predetermined gear ratio.

40. A torque control apparatus for an internal combustion engine of a motor vehicle, comprising:

means for determining a value of a desired drive shaft torque of said motor vehicle on the basis of at least an accelerator pedal stroke;

gear ratio/intake air flow rate determining means for determining on the basis of the determined value of said desired drive shaft torque a gear ratio of a transmission gear coupling an output shaft of said engine to at least a drive shaft of said motor vehicle and a flow rate of intake air fed to said engine; and means for controlling the drive shaft torque of said motor vehicle so that said drive shaft torque assumes said desired drive shaft torque by controlling said transmission gear and said intake air flow rate so that said gear ratio and intake air flow rate as determined can be realized;

wherein said gear ratio/intake air flow rate determining means includes:

gear ratio selecting means for selecting the gear ratio at which an optimal fuel cost can be achieved on the basis of at least said determined desired drive shaft torque;

means for determining an absolute value of difference between a fuel consumption at the current gear ratio and a fuel consumption at the gear ratio selected by said gear ratio selecting means; and means for changing over the current gear ratio to the gear ratio selected by said gear ratio selecting means when said absolute value is not smaller than a predetermined value.

41. A torque control apparatus for an internal combustion engine according to claim 40, wherein said gear ratio/intake air flow rate determining means includes means for maintaining a current gear ratio as it is, when the absolute value of difference between the fuel consumption at the current gear ratio and the fuel consumption at the gear ratio selected by said gear ratio selecting means is smaller than a predetermined value.

42. A torque control apparatus for an internal combustion engine of a motor vehicle, comprising:

means for determining a value of a desired drive shaft torque of said motor vehicle on the basis of at least an accelerator pedal stroke;

intake air flow rate determining means for determining on the basis of the determined value of said desired drive shaft torque a flow rate of intake air fed to said engine;

first selecting means for selecting a gear ratio allowing an optimal fuel cost to be realized on the basis of at least said desired drive shaft torque as determined, when a transmission gear coupling an output shaft of said engine to a drive shaft of said motor vehicle is shifted upward;

second selecting means for selecting a gear ratio by searching a map prescribing relations among the accelerator pedal strokes, the vehicle speeds or the engine rotation numbers and the gear ratios on the basis of the accelerator pedal stroke and said vehicle speed or said engine rotation number, when said transmission gear is being shifted downwardly; and means for controlling the drive shaft torque of said motor vehicle so that it assumes said desired drive shaft torque by controlling said transmission gear and said intake air flow rate so that the gear ratio selected by said first or second selecting means and the intake air flow rate determined by said intake air flow rate determining means can be realized.

43. A torque control apparatus for an internal combustion engine of a motor vehicle, comprising:

means for determining a value of a desired drive shaft torque of said motor vehicle on the basis of at least an accelerator pedal stroke;

intake air flow rate determining means for determining on the basis of the determined value of said desired drive shaft torque a flow rate of intake air fed to said engine;

gear ratio selecting means for selecting a gear ratio allowing an optimal fuel cost to be realized on the basis of at least said desired drive shaft torque as determined; and means for controlling the drive shaft torque of said motor vehicle so that it assumes said desired drive shaft torque by controlling said transmission gear and said intake air flow rate so that the gear ratio selected by said gear ratio selecting means and the intake air flow rate determined by said intake air flow rate determining means can be realized;

wherein said gear ratio selecting means includes:

means for selecting said gear ratio with at least said accelerator pedal stroke as a parameter, when said transmission gear is shifted downward; and means for selecting said gear ratio at least with the opening degree of the throttle valve being used as a parameter, when said transmission gear is shifted upward.

* * * * *